(12) United States Patent
Williams

(10) Patent No.: US 8,581,775 B2
(45) Date of Patent: Nov. 12, 2013

(54) SUBWAVELENGTH APERTURE MONOPULSE CONFORMAL ANTENNA

(75) Inventor: Brett A. Williams, Iowa City, IA (US)

(73) Assignee: Lockheed Martin Corporation, Grand Prairie, TX (US)

( * ) Notice: Subject to any disclaimer, the term of this patent is extended or adjusted under 35 U.S.C. 154(b) by 0 days.

(21) Appl. No.: 12/832,709

(22) Filed: Jul. 8, 2010

(65) Prior Publication Data

US 2011/0102245 A1    May 5, 2011

Related U.S. Application Data

(62) Division of application No. 11/616,639, filed on Dec. 27, 2006, now Pat. No. 8,354,953.

(51) Int. Cl.
*G01S 7/02* (2006.01)
*H01Q 1/28* (2006.01)

(52) U.S. Cl.
USPC ............................................. 342/62; 343/754

(58) Field of Classification Search
USPC ............................................. 342/62; 343/754
See application file for complete search history.

(56) References Cited

U.S. PATENT DOCUMENTS

| | | | |
|---|---|---|---|
| 4,460,901 A * | 7/1984 | Tricoles et al. | 343/872 |
| 5,008,543 A * | 4/1991 | Bertrand et al. | 250/342 |
| 6,851,645 B1 | 2/2005 | Williams et al. | |
| 2006/0175551 A1 | 8/2006 | Fan et al. | |
| 2006/0227039 A1* | 10/2006 | Schroeder et al. | 342/118 |

FOREIGN PATENT DOCUMENTS

WO    WO 2008/123896    10/2008

OTHER PUBLICATIONS

International Search Report mailed Oct. 27, 2008 (PCT/US2007/087377).
Written Opinion mailed Oct. 27, 2008 (PCT/US2007/087377).
Barnes, W.L., et al., "Surface Plasmon subwavelength optics", Nature, Nature Publishing Group, vol. 424, Aug. 14, 2003, pp. 824-830.
Beruete, M., et al., "Very Low Profile 'Bull's Eye' Feeder Antenna", IEEE Antennas and Wireless Propagation Letters, vol. 4, 2005; IEEE Xplore (XP-002499797).
Beruete, M., et al., "Very Low Profile 'Bulls Eye' Feeder Antenna" Dept. de Ingenieria Electrica y Electron., Univ. Publica de Navarra, Pamplona; Spain; Journal Paper; ISSN 1536-1225; C:\EPOPROGS\SEA\.\..\..\epodata\sea\eplogf\internal.log(XP-002499799), 2005.
Beth, H.A., "Theory of Diffraction by Small Holes", The Physical Review, vol. 66, N7 & 8, Oct. 1 & 15, 1944, pp. 163-182 (specifically p. 171).
Hecht, "Optics" $1^{st}$ Ed. 1979, Addison Wesley, p. 84.

(Continued)

*Primary Examiner* — Ian J Lobo
(74) *Attorney, Agent, or Firm* — Withrow & Terranova, PLLC

(57) ABSTRACT

A method for determining a target angle. Optical frequency or radio frequency energy is received through a pair of fixed, foreshortened, and opposing subwavelength apertures in a lensing system. A lens of the lensing system positions at least one of the pair of fixed, foreshortened, and opposing subwavelength apertures and includes a dielectric medium, and a substrate encased in the dielectric medium and defining at least one of the pair of fixed, foreshortened, and opposing subwavelength apertures. A target angle is determined from a steep change of amplitude versus angle presented by the pair of fixed, foreshortened, and opposing subwavelength aperture's beamwidth from the received optical frequency or radio frequency energy.

8 Claims, 20 Drawing Sheets

(56) References Cited

OTHER PUBLICATIONS

Hibbins, et al., "*Experimental Verification of Designer Surface Plasmons*", Science, vol. 308, No. 5722, pp. 670-672 (Apr. 2005).
Lezec et al., "*Beaming Light from a Subwavelength Aperture*", 297 Science, 820-822 (Aug. 2, 2002).
Lockyear, M.J. et al., "*Enhanced Microwave Transmission Through a Single Subwavelength Aperture Surrounded by Concentric Grooves*", Journal of Optics A: Pure and Applied Optics (2005).
Lomakin V., et al, "*Enhanced transmission through metallic plates perforated by arrays of subwavelength holes and sandwiched between dielectric slabs*"; Center for Comput. Electromagn., Univ. of Illinois, Urbana, IL, Journal Paper ISSN 0163-1829; C:\EPOPROGS\SEA\.\..\..\epodata\sea\eplogf\internal.log ; Oct. 20, 2008 (XP-002499798).
Lomakin, Michielssen E., "*Enhanced transmission thorugh metallic plates perforated by arrays of subwavelength holes and sandwiched between dielectric slabs*"; 2005 The Americal Physical Society (XP-002499796).
Middle Tennessee University Physics Department, http://physics.mtsu.edu/ wmr/surfplas.htm, http://www.mtsu.edu/physics/, 2008.
Pendry, J.B., et al., "*The Quest for the Superlens*", Scientific American, pp. 60-67 (Jul. 2006).
Raether, "*Surface Plasmons on Smooth and Rough Surfaces and on Gratings*", (Springer-Verlag 1988).
Schuchinsky et al., "*Enhanced Transmission in Microwave Arrays of Periodic Sub-Wavelength Apertures*", J. Opt. A.: Pure and Applied Optics S102-S109 (Jan. 2005).
Sinji Hayashi, "*Spectroscopy of Gap Modes in Metal Particle-Surface Systems*" p. 81 in Near-Field Optics and Surface Plasmon Polaritions (Satoshi Kawata Ed.) Springer 2001.

* cited by examiner $\omega_p$ = Plasma frequency
$\omega_n$ = Refractive index of the substrate

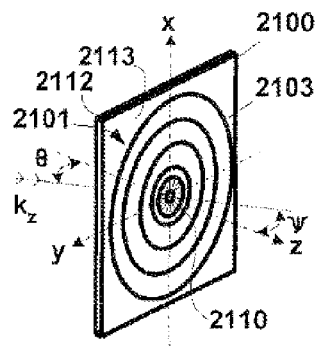
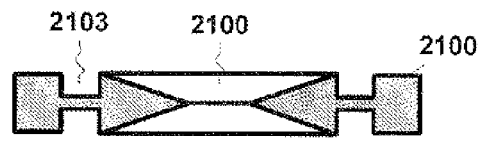
FIG. 21A  FIG. 21B
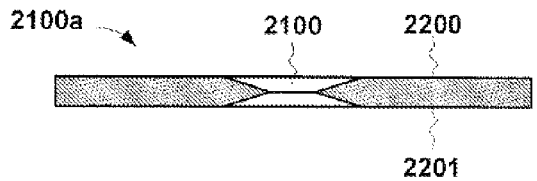
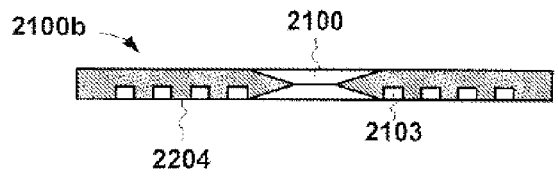
FIG. 22A  FIG. 22B
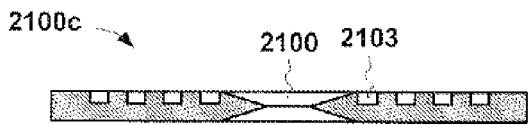
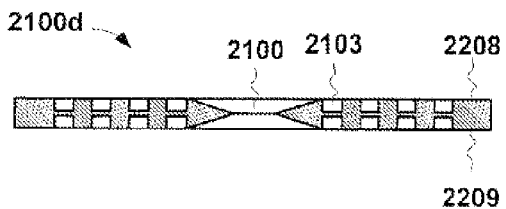
FIG. 22C  FIG. 22D ○ (C) surface structure both sides
----- ($B_2$) surface structure illuminated side
—— ($B_1$) surface structure exit side
* (A) no surface structure

SUBWAVELENGTH APERTURE MONOPULSE CONFORMAL ANTENNA

This is a divisional of U.S. application Ser. No. 11/616,639, entitled "Subwavelength Aperture Monopulse Conformal Antenna", filed Dec. 27, 2006, now U.S. Pat. No. 8,354,953 in the name of the inventor Brett A. Williams, and commonly assigned herewith. The earlier effective filing date of that application is hereby claimed pursuant to 35 U.S.C. §120. That application is also hereby incorporated by reference in its entirety and for all purposes as if set expressly set forth verbatim herein.

BACKGROUND OF THE INVENTION

1. Field of the Invention

The present invention pertains to remote sensing, and, more particularly, to a monopulse antenna employing a subwavelength aperture for use in missile guidance.

2. Description of the Related Art

Many types of guided airborne systems have historically used hemispherical radomes at their front end. The hemispherical shape was chosen to accommodate certain physical characteristics in the operation of the guidance systems. While increasing the performance of the guidance systems, they sometimes hampered the overall performance of the airborne system. One significant drawback to hemispherical radomes is that they create high levels of drag, which inhibit the speed of the airborne system. This is particularly undesirable in a military context because it renders the airborne system more vulnerable to enemy fire, thereby decreasing its survivability, and reduces its lethality.

Efforts therefore have been directed at developing new techniques that would accommodate the use of sleek, low drag radomes fostering speedier airborne systems. One technique developed as a part of this effort was non-coherent Fresnel direction finding ("NCFDF"). See, e.g., U.S. Letters Pat. No. 6,851,645, entitled "Non-Coherent Fresnel Direction Finding Method and Apparatus", issued Feb. 9, 2005, to Lockheed Martin Corporation as assignee of the inventors Brett A. Williams, et al. ("the '645 patent"). This technique ably accommodates the use of sleek radomes. The '645 patent is hereby incorporated be reference for its teachings regarding NCFDF as if expressly set forth herein verbatim.

At the same lime, some in the art have been pushing to decrease the size of such systems to obtain smaller, smarter, guided airborne systems. Desires for smaller guided projectiles, for instance, have produced pressure on sensors to fit within ever smaller dimensions. Opportunities for what may be termed "micro-missiles" such as darts or bullet-like projectiles in the neighborhood of 0.25" diameters, or less, increase these strenuous demands still further.

NCFDF begins to suffer for miniature missiles due to shrinking real-estate available for its window apertures and their associated lengths. The NCFDF apparatus in the '645 patent, for instance, uses a window/light-pipe design. The walls of the light-pipe are curved, reducing light rejection compared to straight walls. The aperture of the window collects light over its surface while the pipe simply guides light to its exit by multiple reflections. No focused, phase-front sensitive optics is required and wall reflection is most efficacious for total internal reflection without reflective coatings.

Light rejection and window field-of-view depend on a relation between aperture and light pipe length—that is, the aperture must be proportional to that length to avoid ever increasing reflection angles within the light-pipe until ultimately they are rejected back out to free space. If length limits are imposed, thus reducing allowable aperture dimensions, then additional apertures can be added which can satisfy the length relation for a smaller aperture/multi-window approach, increasing aperture area by the number of added windows. Yet micro-missiles have virtually no length allowance and even spacious airframes may have existing components conflicting with light-pipe placement.

The problem is to provide a surface conformal antenna on a sleek radome to allow kinematic range and lethality due both to speed and a cleared central axis for lethality enhancer placement, in addition the antenna must provide sufficient angle accuracy and range detection (coupled with the receiver).

The present invention is directed to resolving, or at least reducing, one or all of the problems mentioned above.

SUMMARY OF THE INVENTION

In various aspects and embodiments of the present invention, incident electromagnetic radiation is received through a subwavelength aperture in a lens, the subwavelength aperture being defined by a substrate encased in a dielectric medium.

BRIEF DESCRIPTION OF THE DRAWINGS

The invention may be understood by reference to the following description taken in conjunction with the accompanying drawings, in which like reference numerals identify like elements, and in which:

FIG. 21A-FIG. 21B depicts a subwavelength aperture and bull's eye grating used in investigating several physical responses;

FIG. 22A-FIG. 22D) illustrate three different surfaces used in the investigation depicted in FIG. 21;

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
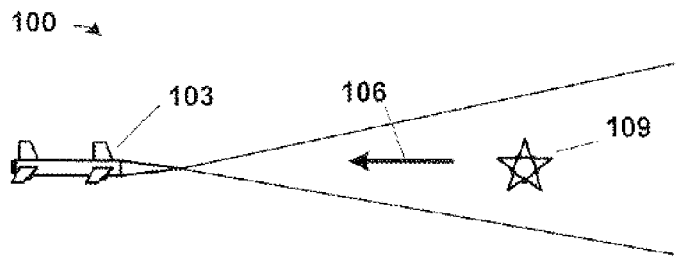
FIG. 1 depicts one scenario in which the present invention may be employed in one particular embodiments.

FIG. 1 illustrates one particular embodiment 100 of the present invention. In the embodiment 100 of FIG. 1, a platform 103 receives radiation 106, from a target 109. The implementation of the platform 103 is not material to the practice of the invention although the invention is particularly suited for use in compact, high-speed platforms, such as missiles. Similarly, the implementation of the target 109 is not material to the practice of the invention. However, given its particular suitability, is particularly useful against certain types of targets such as, for example, a rocket propelled grenade ("RPG") or a freespace mortar.

The radiation 106 is typically a bandwidth of interest for the platform 103. It therefore usually is known a priori, i.e., a bandwidth centered on the frequency of the radiation 106. In various alternative embodiments, the received energy may be in any of several bands, including—but not limited to—the visible, ultraviolet ("UV"), near infrared ("NIR"), medium-wavelength, infrared ("MWIR") and long-wavelength infrared ("LWIR") bands, whether these wavelengths originate from laser designation or by virtue of radiation emitted by thermally hot targets, or through some other mechanism. In the illustrated embodiment, the radiation 106 is a radio frequency ("RF") signal, e.g., a RADAR signal.

Figure 2A:
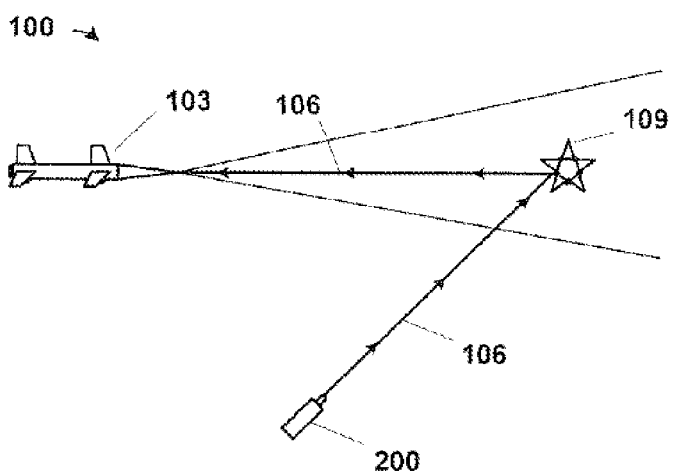
FIG. 2A-FIG. 2B illustrate alternative implementations of the embodiment in FIG. 1 in semi-active and active systems.
Figure 2B:
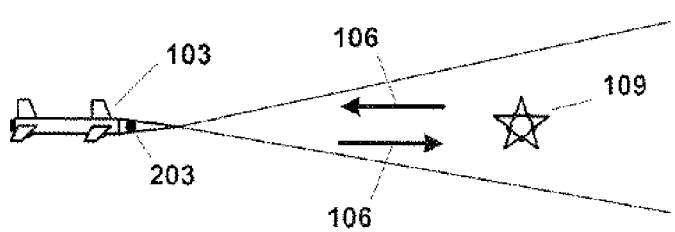

The frequency of the radiation 106 will depend to some degree on other implementation specific factors. As an example, the invention may be used in passive, semi-active, or active system. For present purposes, a passive system would be one in which the radiation 106 emanates from the target 109. A semi-active system, such as the one in FIG. 2A, is one in which the radiation 106 originates from a source 200 off-board the platform 103 and is reflected from target 109 to the platform 103. An active system, such as the one shown in FIG. 2B, is one in which the radiation 106 originates from a source (203) on-board the platform 103 and is reflected from target 109 back to the platform 103. Active and semi-active systems such as those shown in FIG. 2A-FIG. 2B generally employ radio frequency or optical frequency signals while passive systems may use signals drawn from a wider range of frequencies.

Figure 3A:
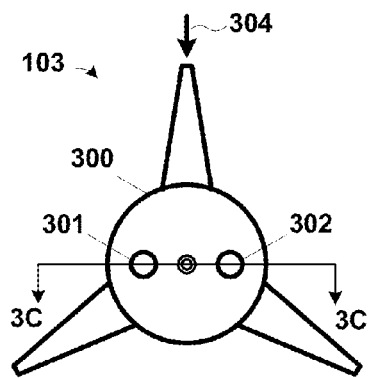
FIG. 3A-FIG. 3C depict one particular implementation of the platform in FIG. 1 in a plan, head-on view; a plan, side view; and a partially sectioned side view, respectively, the view in FIG. 3C being taken along the line 3C-3C in FIG. 3A.
Figure 3B:
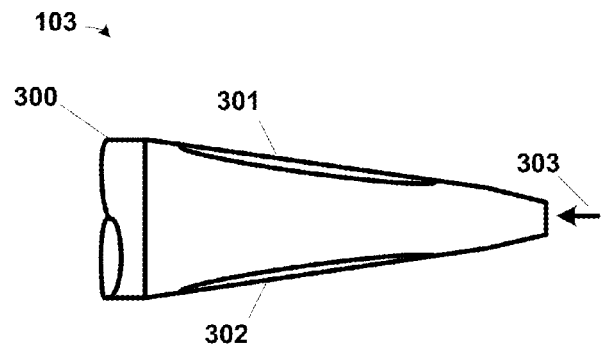
Figure 3C:
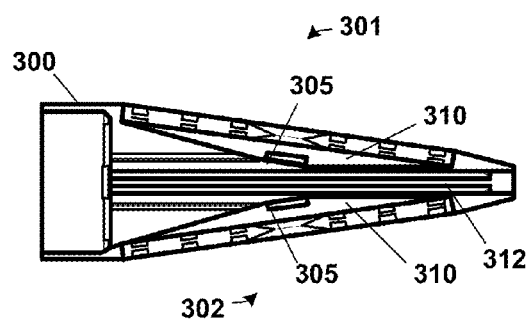

FIG. 3A-FIG. 3C depict one particular implementation of the platform in FIG. 1 in a plan, head-on view; a plan, side view; and a partially sectioned side view, respectively, the view in FIG. 3C being taken along the line 3C-3C in FIG. 3A. The forward end of the platform 103 comprises a radome 300. The radome 300 of the illustrated embodiment is also fabricated from a suitable metal in a manner well known to the art. However, other embodiments may employ other materials, such as dielectric materials like those used to implement the lenses 301, 302, as discussed below. Note that embodiments employing dielectric materials rather than a metal will not exhibit the surface plasmon polariton effect discussed below, but that the diffraction that is also discussed further below will still occur.

The radome 300 in the illustrated embodiment is a "sleek" radome, such as a von Karman or an Ogive radome. In alternative embodiments, the radome 300 may be a "blunt" radome, such as a semi-spherical or hemispherical radome. However, the choice does have some impact on the implementation of other aspects of the platform 103, as will be discussed further below.

One reason the illustrated embodiment employs a sleek radome 300 is because it also employs a non-coherent Fresnel direction finding ("NCFDF") technique. As will be described more fully below, and as described in the '645 patent incorporated above, the NCFDF technique relies on high incident angles between the received radiation 106, shown in FIG. 1, and the radome 300. It also relies on overlapping fields of view, which can also be accommodated by a sleek radome. Unlike typical antennas, however, the NCFDF technique is independent of the baseline between the lenses 301, 302. Regardless, a platform employing NCFDF should present strong incident angles to the oncoming wave and come in pairs for targets of unknown amplitude variation.

Another consequence of the sleek radome 300 is that the lenses 301, 302 are "foreshortened" from the vantage point of the received radiation 106. Thus, to the approaching radiation 106, the lenses 301, 302 appear to be smaller than they really are. It is the apparent size, however, that determines the amount of radiation in the approaching wave front that is actually received and detected. As the design of the radome 300 becomes more sleek, the more the foreshortened the lens becomes and the more signal that is rejected.

The sleekness of the radome 300 therefore presents a tradeoff to the system designer. A more sleek radome 300 improves the accuracy of the NCFDF while increasing the amount of the received radiation that is rejected. Other design constraints may also impact the tradeoff, such as velocity, weight, and size constraints, in a manner that will be apparent to those skilled in the art having the benefit of this disclosure. For the illustrated embodiment, the dielectric material used to implement the lenses 301, 302 as discussed further below may also impact the tradeoff. In general, however, the illustrated embodiment benefits from a high degree of sleekness for the radome 300 yielding a concomitant high degree of lens foreshortening.

A plurality of lenses 301-302 are situated in the radome 300. The number of lenses is not material to the practice of the invention, but will be a consideration in any given embodiment. The lenses 301-302 are opposed, forward looking lenses in the region in which their fields of view overlap. The lens 301 is shown in enlarged views in FIG. 4A-FIG. 4C in the same views as in FIG. 3A-FIG. 3C. Note that, in this particular embodiment, the lens 302 has the same construction as the lens 301, and so is not shown. The lens 301 comprises a substrate 400 encased by a dielectric medium 403, shown in two parts for the sake of clarity in FIG. 4A.

The substrate 400 is, in the illustrated embodiment, fabricated from a metal. Simple metals, such as silver, should work well. However, alternative embodiments may employ other materials. For example, the substrate may be fabricated from a semiconducting material such as Germanium, whether intrinsic or doped. These embodiments will not generate the Plasmon polaritons relied upon in some embodiments for enhancement of the incident radiation.

The dielectric medium 403 may be fabricated from practically any dielectric material, such as plastic, fused silica, or diamond and fluid materials such as air may be used, in the illustrated embodiment, the dielectric medium is a solid sold under the mark RT DUROID 5870 available from Rogers Corporation, One Technology Drive, PO Box 188, Rogers, Conn. 06263-0188 and may be contacted at 860.774.9605 (phone) or 860.779.5509 (fax) or from their website at http://www.rogerscorporation.com/. This material is a glass microfiber reinforced polytetrafluoroethylene ("PTFE") composite and additional information is available on the Internet at http://www.rogerscorporation.com/mwu/pdf/5000data.pdf#search='duroid'. This material has an index of refraction n=1.5.

In the illustrated embodiment, the dielectric medium 403 comprises the same material on both the illumination and exit sides of the substrate 400. This is not necessary to the practice of the invention. In some of these embodiments, the different materials may even have different indices of refraction. Performance constraints or embodiments using the NCFDF technique will typically ensure that a high dielectric material will be used. Some embodiments may employ different materials to implement the dielectric medium 403 on the opposing sides of the substrate 400. In general, however, the illustrated embodiment benefits from a high dielectric medium encasing the substrate 400.

The substrate 400 defines a subwavelength aperture 409. The aperture 409 is "subwavelength" in the sense that its diameter is dimensioned to be less than the wavelength of the incident energy of interest. For example, in the illustrated embodiment, the signal 124 in FIG. 1 is a radio frequency signal, and so the diameter of the aperture 409 is less than the wavelength of a radio frequency signal. Radio frequency is generally accepted to be between about 3 Hz-300 GHz, which yields wavelengths between 100,000 km-1 mm. However, the signal of interest will have a known, narrower range of frequencies to which the dimension of the aperture 409 may be tailored. As will be apparent to those skilled in the art having the benefit of this disclosure, what constitutes "subwavelength" will vary with the frequency of the signal of interest. For example, the present invention may be used with optical frequencies, which will yield different dimensions for "subwavelength".

Figure 4A:
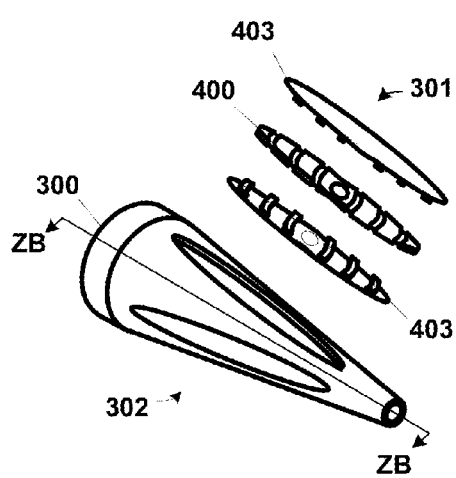
FIG. 4A-FIG. 4C are enlarged views of a lens first shown in FIG. 3A-FIG. 3C in the same views as in FIG. 3C-FIG. 3C.
Figure 4C:
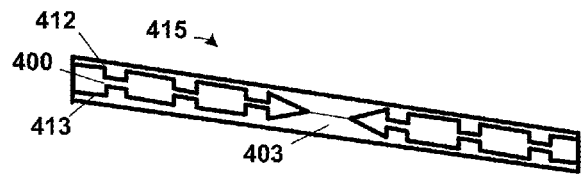
Figure 4B:
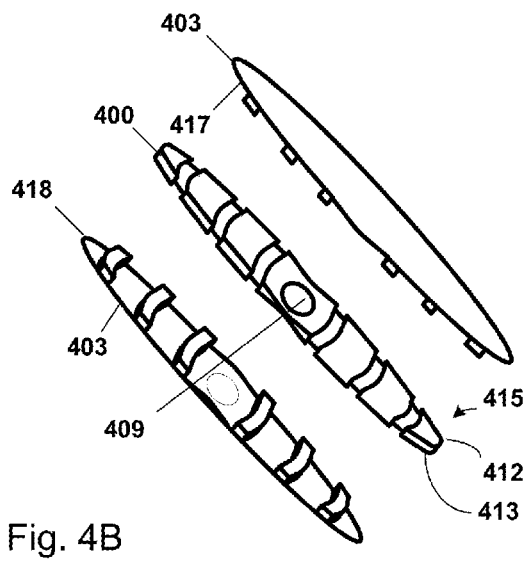

The aperture 409 is countersunk on both the top and bottom faces 412, 413 as is shown in FIG. 4A for the illumination side 412. This produces an hourglass-shaped cross-section as is shown in FIG. 4B. This is not required for the practice of the invention, however. For example, the aperture 409 may be countersunk on only one of the illumination and exit sides 412, 413. The aperture 409 also may not be countersunk at all in alternative embodiments such that the aperture 409 is a smooth bore. Still other variations on this theme may by practiced in still other embodiments.

Figure 5A:
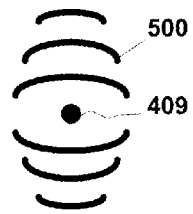
FIG. 5A-FIG. 5D conceptually illustrate alternative implementations of the periodic surface feature of the substrate of the lenses shown in FIG. 4A-FIG. 4C.
Figure 5B:
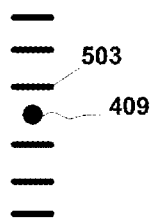
Figure 5C:
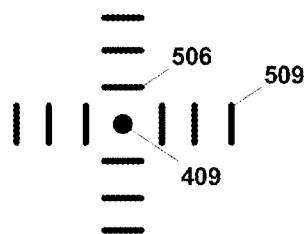
Figure 5D:
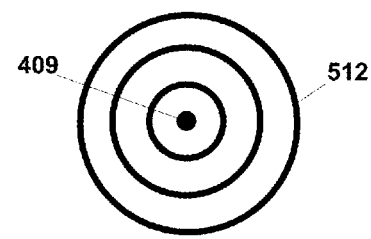

The substrate 400 defines a periodic surface feature generally indicated at 415 in FIG. 4B. (Note that, because the dielectric medium 403 encases the substrate 400, the dielectric medium 403 mirrors the periodic surface feature 415 on the and faces 417, 418 that contact the substrate 400.) The periodic surface features 415 are optional, and may be omitted in some embodiments. However, they generally improve the efficacy of the subwavelength aperture 409 in terms of the evanescent wave generation.

Where employed, the periodic surface feature 415 may take many forms. Gratings, bumps, posts, divots, and roughness ail may work in various alternative embodiments. In the illustrated embodiment, the periodic surface feature 415 comprises a plurality of arcuate ridges, such as the arcuate grooves 500 (only one indicated), conceptually depicted in FIG. 5A. FIG. 5B illustrates an alternative implementation of the surface feature 415 comprising a plurality of linear grooves 503 (only one indicated). FIG. 5C illustrates an implementation in which linear grooves 506, 509 (only one of each indicated) that radiate in orthogonal directions. In the illustrated embodiment, these directions would be parallel and transverse to the longitudinal axis of the platform 103. FIG. 5D illustrates an implementation in which the periodic surface feature 415 comprises a plurality of concentric rings 512. Note that the periodic surface feature 415 may be implemented using both negative and positive features, e.g., grooves and/or ridges. The periodic surface feature 415 also generally exhibit uniform characteristics, e.g., in terms of period (or spacing), height, and width.

The invention admits wide variation in the implementation of the periodic surface feature(s) 415. Just as the periodic surface feature 415 may be omitted altogether in some embodiments, it can be omitted on only one side of the substrate 400 while being employed on the other. Thus, for example, a periodic surface grating 415 may be formed only on the face on the illumination side 412 of the substrate 400 and omitted on the face on the exit sides. The illustrated embodiment also employs the same periodic surface feature 415 on both faces 412, 413—namely, the arcuate grooves shown in FIG. 5A. Alternative embodiments may employ different periodic surface features 415 on the illumination and exit sides of the substrate 400.

Note that the implementation of the periodic surface feature may also affect other aspects of the design for the lenses 301, 302. For example, as was mentioned above, some embodiments may omit the periodic surface feature 415. The omission will degrade performance to some degree as it will degrade the coupling discussed further below. To compensate for this degradation, such embodiments can employ additional apertures 409. Other examples will become apparent to those skilled in the art having the benefit of this disclosure.

Returning to FIG. 3A-FIG. 3C, the lenses 301, 302 should also be able to withstand applicable environmental conditions. In the illustrated embodiment, one important environmental condition is aerodynamic heating due to the velocity of the platform 103. Another important environmental condition for the illustrated embodiment is abrasion, such as that caused by dust or sand impacting the lenses 301, 302 at a high velocity. Thus, for the illustrated embodiment, fused silica is a highly desirable material for lenses 301, 302. Alternative embodiments may employ ZnSe, $Al_2O_3$, Ge, Pyrex, diamond, quartz, fused quartz, and glass in addition to the materials discussed above in some embodiments.

Note that the choice of materials will affect other aspects of the implementation. For example, in some embodiments, the dielectric medium 403 encasing the substrate 400, both shown in FIG. 4, may be implemented with air rather than the DUROID material of the illustrated embodiment. However, if air is used, direction finding is performed from the decline in amplitude vs. angle by "beamwidth" of the subwavelength aperture, while with the higher index dielectrics like DUROID over the subwavelength aperture, one can employ NCFDF as an enhancement to angle finding and employ the NCFDF technique that cannot be used for the air-dielectric case. More particularly, NCFDF uses essentially two pieces—Fresnel amplitude vs. angle change and standard amplitude comparison monopulse sum and difference. Hence, without Fresnel one could simply use standard amplitude comparison monopulse. As long as there is a amplitude change with angle change standard amplitude comparison monopulse can be used.

Figure 6A:
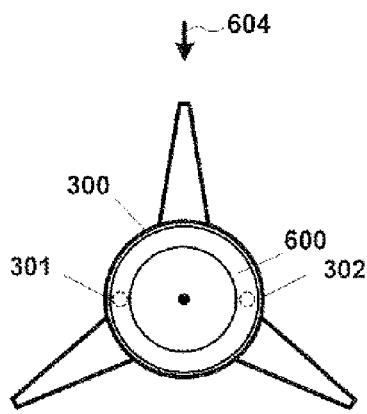
FIG. 6A-FIG. 6B illustrate and alternative implementation for the lensing system of the platform first shown in FIG. 3A-FIG. 3C.
Figure 6B:
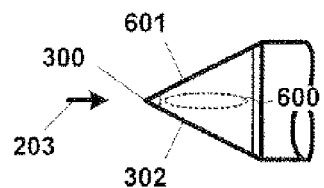

Depending upon a number of factors, including the shape of the radome 300, the strength of the lens materials, manufacturability, and cost, it may be preferable to implement the lenses 301, 302 collectively as a collar extending around the perimeter of the radome 300. Thus, the lenses 301, 302 comprise a lensing system that, in alternative embodiments, may be implemented in a collar, such as the collar 600 shown in FIG. 6A-FIG. 6B. Thus, the lenses 301, 302 actually comprise a lensing system and are but one example of a means for lensing the radome 300. Other lensing systems may employ other lensing means in alternative embodiments.

Referring now to FIG. 3C, the radome 300 houses a pair of feeds 305, one for each of the lenses 301, 302. The illustrated embodiment is intended for use with radio frequencies, and so the feeds 305 tire routed to radio frequency ("RF") detectors. The feeds 305 will vary in implementation with the bandwidth of interest of the received radiation with which the platform 103 is intended to work. Those working at optical frequencies will implement detectors with optical detectors and those operating at infrared ("IR") frequencies will implement them with IR detectors, for example. Frequency-dependent detectors are well known and commonly used in the art, and those in the art having the benefit of this disclosure will appreciate these types of considerations in implementation.

Note the ullage in the chamber 310 defined by the radome 300. This is one of the significant benefits of the present invention in that it reduces the number of components needed to receive and detect the incident radiation. This clears the central axis of the radome 300 for other uses. The illustrated embodiment is a passive system, and so the ullage is maximized. In an active system, for example, some of the ullage would be consumed by components used in signal generation and transmission. The ullage can be left void, i.e., filled with air, or placed under vacuum. It may also be filled with a dielectric material, e.g., such as the material from which the dielectric medium 403 is fabricated. Alternatively, the ullage may be used to house other components of the platform 103, such as signal processing and computing components (not shown). Or, in some embodiments, the ullage could be used to house additional explosives. Note, however, the volume 310 cannot be obstructed as RF passed through this region to the RF feed 305. The central region may, however, be used for other components.

Figure 7:
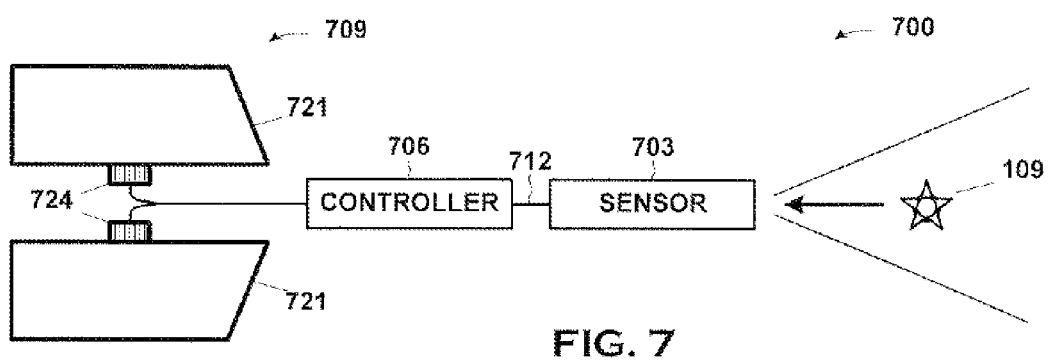
FIG. 7 depicts the detection of the target designation and control of the flight control mechanisms of the platform first shown in FIG. 1.

FIG. 7 conceptually depicts a selected portion 700 of the command and control ("2C") architecture of the platform 103. The portion 700 depicts a sensor 703, a controller 706, and a flight control mechanism 709. Note that, as will he appreciated by those skilled in the art having the benefits of this disclosure, the 2C architecture of the platform 103 is much more complex and involved. However, details unrelated to the present invention have been omitted for the sake of clarity and so as not to obscure the present invention.

The sensor 703 comprises those elements of the invention discussed above relative to FIG. 3A-FIG. 3C and FIG. 4A-FIG. 4C. The controller 706 receives the output 712 of the sensor 703. The controller 706 processes the output 712 employing the NCFDF technique disclosed in the incorporated '645 patent to determine the location of the target 109 relative to the platform 103. In the illustrated embodiment, the controller 706 also outputs guidance navigation control ("GNC") commands to the flight control mechanism 709 of the platform 103 to direct the platform 103 to the target 109.

Figure 8:
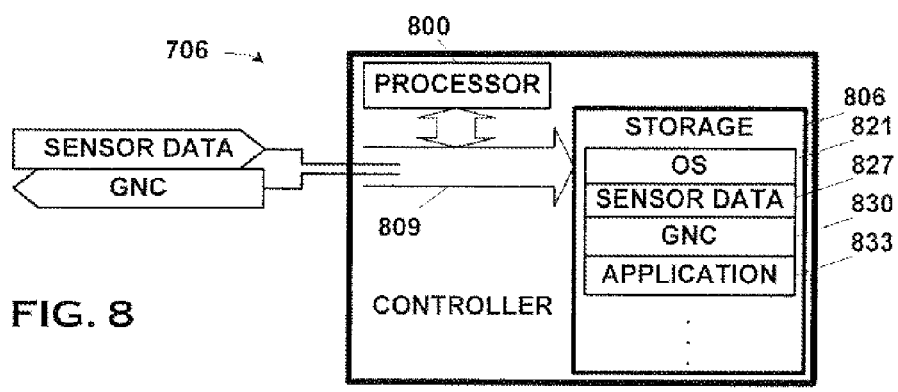
FIG. 8 depicts a controller first shown in FIG. 7 on board the platform of FIG. 1.

FIG. 8 depicts selected portions of the controller 706, first shown in FIG. 7, in a block diagram. The controller 706 includes a processor 800 communicating with storage 806 over a bus system 809. Each of these components will now be discussed in turn.

The processor 800 may be any suitable processor known to the art. In general, the controller 706 will handle a fair amount of data, some of which may be relatively voluminous by nature and which is processed quickly. Thus, certain types of processors may be more desirable than others for implementing the processor 800. For instance, a digital signal processor ("DSP") may be more desirable for the illustrated embodiment than will be a general purpose microprocessor. In some embodiments, the processor 800 may be implemented as a processor set, such as a microprocessor with a mathematics co-processor.

The storage 806 may be implemented in conventional fashion and may include a variety of types of storage, such as a hard disk and/or random access memory ("RAM"). The storage 806 will typically involve both read-only and writable memory implemented in disk storage and/or cache. Parts of the storage 806 will typically be implemented in magnetic media (e.g., magnetic tape or magnetic disk) while other parts may be implemented in optical media (e.g., optical disk). The present invention admits wide latitude in implementation of the storage 806 in various embodiments.

The storage 806 is also encoded with a variety of software components, including an operating system 821, the sensor data 827, a guidance navigation control ("GNC") component 830, and a software application 833. That is, these software components "reside" on the storage 806. The processor 800 runs under the control of the operating system ("OS") 821, which may be practically any operating system known to the art. The controller 706 receives the sensor data 827 from the sensor 703 (shown in FIG. 7) and stores it on the storage 806. The sensor data 827 may be stored in any suitable type of data structure known to the art. such as first-in, first-out ("FIFO") queue. The GNC component 830 issues suitable GNC commands to the flight control mechanism 709 as mentioned above. The nature of tire GNC commands will be dependent on the implementation of the flight control mechanism 709, which is further discussed immediately below.

Returning to FIG. 7, the flight control mechanism 709 is shown as comprising a plurality of flight control surfaces 721—i.e., fins—and their actuators 724. As will be appreciated by those in the art having the benefit of this disclosure, many types of flight control mechanisms may be employed. Many of these types, such as fins and canards, employ flight control surfaces. Others do not, however. For instance, some weapons might employ thrusters in addition to or in lieu of flight control surfaces. The invention is not limited by the nature of the flight control mechanism employed. Similarly, the number of components within the flight control mechanism 709 is not material. For instance, the platform 103 might employ three, four, or more flight control surfaces 721 or as many as 12 thrusters. Furthermore, the flight control mechanism 709 may be located aft (as shown), forward, or both aft and forward of the platform 103, depending in the implementation. Thus, the flight control surfaces 721 are, by way of example and illustration, but one means for controlling the flight of the platform 103 in accordance with the present invention.

Returning again to FIG. 8, the software application 833 analyzes the sensor data 827 to determine the location of the target 109. In the illustrated embodiment, if the software application 833 detects a change in position for the target 109, the software application 833 notifies the GNC component 830. The GNC component 830 then issues commands to the flight control mechanism 709 to alter the heading of the platform 103 to maintain an intercept course with the target 109. The software application 833 may constitute a constituent part of the GNC component 830 in some embodiments, or may constitute a stand alone software component interfaced with the GNC component 830.

As is apparent from the discussion above, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be home in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Thus, in operation, the platform 103 receives radiation 106, from a target 109 as shown in FIG. 1. The radiation 106 impinges upon the foreshortened lenses 301, 302, shown in FIG. 3A-FIG. 3C, at a high angle of incidence engendered by the sleek profile of the radome 300. The radiation 106 propagates through the dielectric medium 403, shown in FIG. 4A-FIG. 4C, the subwavelength aperture 409 of the substrate 400, and the chamber 310, shown in FIG. 3C defined by the radome 300, where it is intercepted by the feed 305.

The propagation of the radiation 106 through the subwavelength apertures 409 creates "evanescent waves". Below their cut-off frequency the subwavelength apertures 409 are too small to pass longer waves—which is what "cut-off" means—as antennas normally do. The subwavelength apertures 409 therefore, in a manner of speaking, force waves too long to get through the apertures 409 anyway by "squeezing" the radiation 106 into the subwavelength apertures 409 as evanescent waves. The evanescent waves create a condition shown in FIG. 19A-FIG. 19B and described more fully below. Essentially, this condition looks like a "surface wave" phenomena. Such surface waves, or surface mode phenomena include plasmons and polaritons. The substrate 400 becomes a "meta material", which is a class of materials that has a negative index of refraction, as discussed further below.

Thus, the feeds 305 detect radio waves emergent from the evanescent waves generated when the radiation 106 impinges upon the subwavelength apertures 409. The detected radiation is then processed by the controller 706, shown in FIG. 7 using the NCFDF technique disclosed in the incorporated '645patent. In this technique, the magnitude of the transmitted radiation decreases as a continuous function of increasing angle of incidence, known as Fresnel transmittance. Opposing radiation detectors then detect this transmitted radiation as discussed above, thereby creating a pair of detection signals. By dividing the difference of the detection signals by the sum of the detection signals, the processor 800, shown in FIG. 8, of the controller 706 generates a beta, angle error curve and finds the relative direction of the radiation.

More particularly, as seen in FIG. 8A, the transmittance of radiation, as a percentage, through an air/fused silica interface is a strong function of both incidence angle and polarization based upon Fresnel's equations:

$$t_s = 2n_i \cos(\theta_i)/[n_i \cos(\theta_i) + n_t \cos(\theta_t)], \quad (1)$$

and $$t_p = 2n_i \cos(\theta_i)/[n_i \cos(\theta_t) + n_t \cos(\theta_i)]. \quad (2)$$

In Fresnel's equations, Eq. (1) and Eq. (2), $t_s$ corresponds to the transmittance for S-polarized (perpendicular) radiation and $i_p$ corresponds to the transmittance for P-polarized (parallel) radiation. $\theta_i$ and $\theta_t$ correspond to the angles of incidence and transmission, respectively. Lastly, $n_i$ and $n_t$ correspond to the indices of refraction for the incident and transmitted materials, respectively. This dependence of the transmittance upon the angle of incidence shall be defined as Fresnel transmittance.

Curve 902 approximates the Fresnel transmittance ts for radiation incident upon the air/fused silica interface, while curve 904 approximates the Fresnel transmittance $i_p$. At low angles, such as point 910 at 10°, corresponding to a blunt or hemispherical radome, Fresnel transmittance is not a strong function of angle at all. More specifically, for an incident angle of 10°, radiation received within an angle of +10° (point 912) to −10° (point 914) shows virtually no difference in Fresnel transmittance, regardless of polarization. In contrast, an incident angle of 70° (point 820), corresponding to a relatively sleek radome, shows significant differences in Fresnel transmittance for angles ±10°.

Figure 9A:
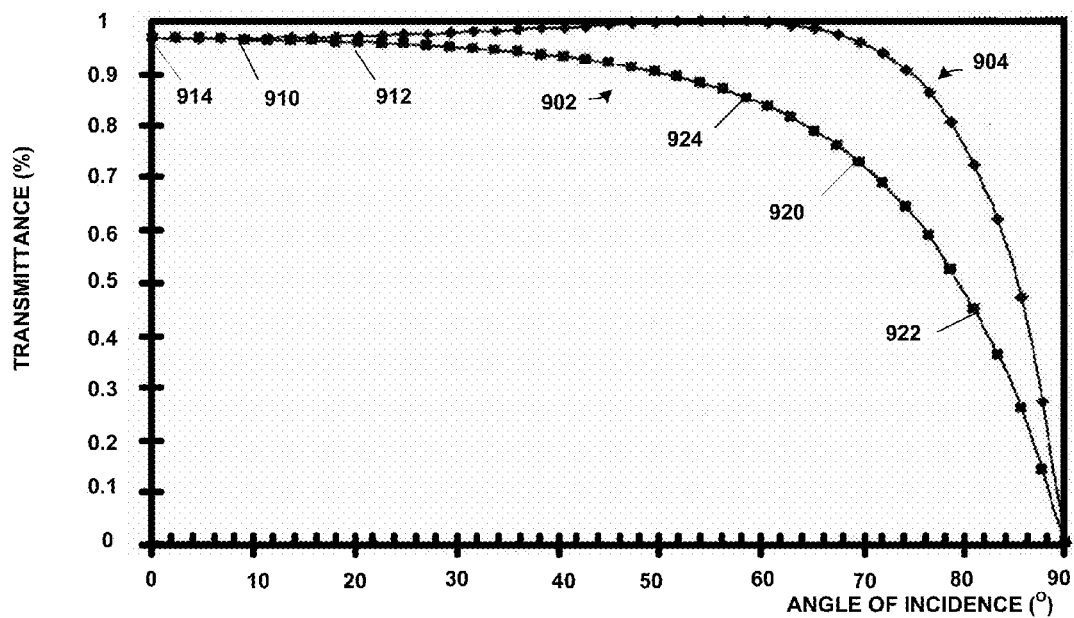
FIG. 9A-FIG. 9B illustrate the relationship between angle of incidence and transmission of radiation impinging on the lenses of the radome shown in FIG. 1.
Figure 9B:
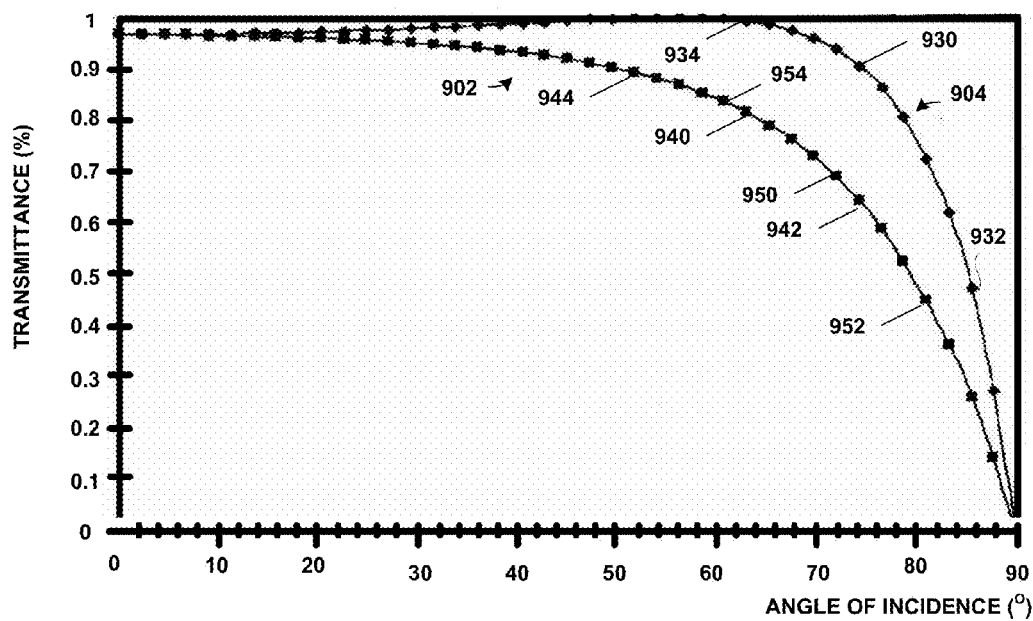

Specifying a middle field of view transmittance is an alternative method for defining a direction finding system design and is illustrated in FIG. 9B. For example, for a middle field of view Fresnel transmittance of 90% for P-polarized radiation (point 930), a ±10° field of view provides a change in Fresnel transmittance of approximately 50% (points 932 and 934). A middle field of view Fresnel transmittance of 80% for S-polarized radiation (point 940) provides a change in Fresnel transmittance of approximately 25% (points 942 and 944) over the ±10° field of view. A middle field of view Fresnel transmittance of 70% would be preferable for the S-polarized radiation (point 950) as the ±10° field of view change in Fresnel transmittance increases to 40% (points 952 and 954). Because of this continuous or smooth variation in Fresnel transmittance as a function of incidence angle, even a single radiation detector can provide some indication of the angle of incidence if properly calibrated. However, at least three radiation detectors are preferred to provide the level of control desired for a precision guided munitions traveling at a high velocity.

Thus a sleek radome system benefiting from the Fresnel transmittance has a greater angular sensitivity than a blunt or hemispherical radome system. To benefit from the Fresnel transmittance, the incidence angle should be selected such that the Fresnel transmittance of the radiation varies significantly over the desired field of view, i.e., the slope of the Fresnel transmittance is significantly difference from zero. The above example employed a field of view of ±10° and a fused silica-based material for the lenses 301, 302. Under these conditions, a minimum angle of incidence at boresight of at least approximately 60° is preferred, with at least approximately 60° being more preferred. The maximum incidence angle is approximately 80° when a ±10° field of view is used.

Note that these minimum and maximum incidence angles are a function of the lens material and the field of view. Narrower fields of view will require greater minimum angles to ensure that the Fresnel transmittance varies significantly over the desired field of view. Based upon Fresnel's equations, Eq. (1) and Eq. (2), different indices of refraction will change the shape of the Fresnel transmittance curve, and thus the minimum angle of incidence. For example, $Al_2O_3$ has a greater index of refraction than fused silica, and therefore would require a smaller minimum angle of incidence. One of skill in the art will appreciate that these and other system parameters, including detector sensitivity, will determine how great the instantaneous rate of change of the Fresnel transmittance as a function of angle of incidence would need to be to achieve a required angle sensitivity.

Based upon the beta angle error curve, the processor 800 generates an appropriate error correction signal for guiding the platform 103 based upon the relative direction of the received radiation. The correction signal is translated by the GNC component 830 into control signals for the actuators 724 of the flight control surfaces 721. This results in a course correction for the platform 103 to keep it on an intercept course for the target 109. The process iterates and is performed continually as the platform 103 homes on the target 109 until intercept occurs.

The present invention therefore provides one or more of surface area reduction, volume reduction, power enhancement servicing detection range in a radome surface conformal solution with cleared axis, in its various aspects and embodiments. Note that not all embodiments will necessarily manifest all these features. However, by leveraging enhanced transmission through subwavelength apertures the loss they engender can be offset (at least in part) and the size of subwavelength apertures satisfies area/volume restrictions. Joining the aperture's power pattern with the Non-Coherent Fresnel Direction Finding ("NCFDF") monopulse angle finding technique provides the same accuracy (or slightly better) as the aperture/wavelength independent method provided by NCFDF alone. In addition, the dielectric medium (in which NCFDF takes place) allows for size reduction of metal surface features (an inverse proportion) that provide signal enhancement at the expense of added signal loss proportional to refraction index.

Thus, in selected aspects, the present invention:
  employs subwavelength apertures as antennas at either radio or optical frequency wavelengths;
  enhances transmitted evanescent signal by surface gratings;
  satisfies demanding radome surface area/volume constraints of new, more demanding applications;
  provides a sleek radome conformal antenna;
  yields a small profile;
  facilitates a miniature on-board missile seeker because of the small profile;
  frees radome volume to much needed motor and lethality;
  is polarization "insensitive" for larger radomes; and
  permits all weather operation at radio frequency wavelengths.

Note that not all embodiments will manifest each or all of these aspects and that some embodiment may exhibit other aspects not set forth above.

And now, to further an understanding of the present invention, a more technical exposition of the principles underlying the design of the embodiments disclosed above will be set forth. The present invention in the particular embodiment discussed here employs angle dependent transmissivity of subwavelength apertures by virtue of evanescent wave diffraction with slight signal enhancement by surface plasmons. The measured effects of evanescent coupling through subwavelength apertures and pseudo-standing wave effects of diffraction allowing enhancement are used here to implement an angle measurement antenna system with high back lobe rejection in the radio spectrum. While the method and apparatus described is most concerned with radio waves, any part of the spectrum including optical will satisfy the method as long as design parameters of the device are accounted for versus wavelength.

Figure 10A:
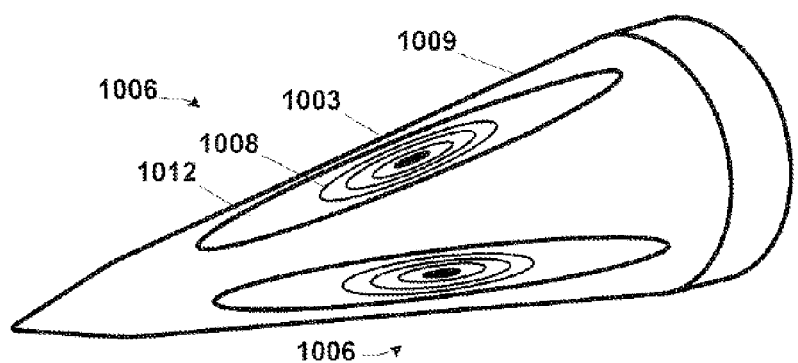
FIG. 10A-FIG. 10B illustrate one particular embodiment of a subwavelength aperture monopulse conformal antenna.
Figure 10B:
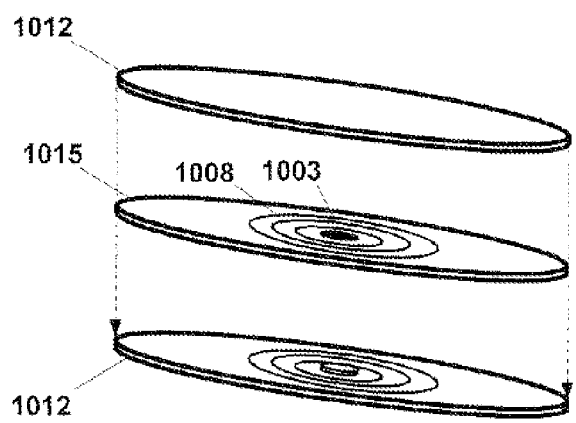
Figure 19A:
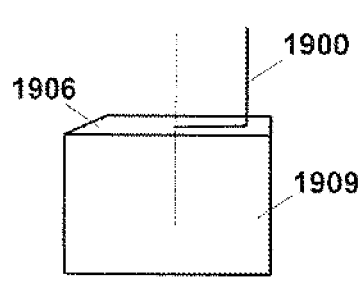
FIG. 19A-FIG. 19B illustrate incident E-field at metal and metamaterial interfaces, respectively.
Figure 19B:
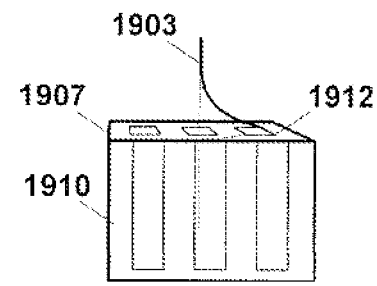
Figure 20:
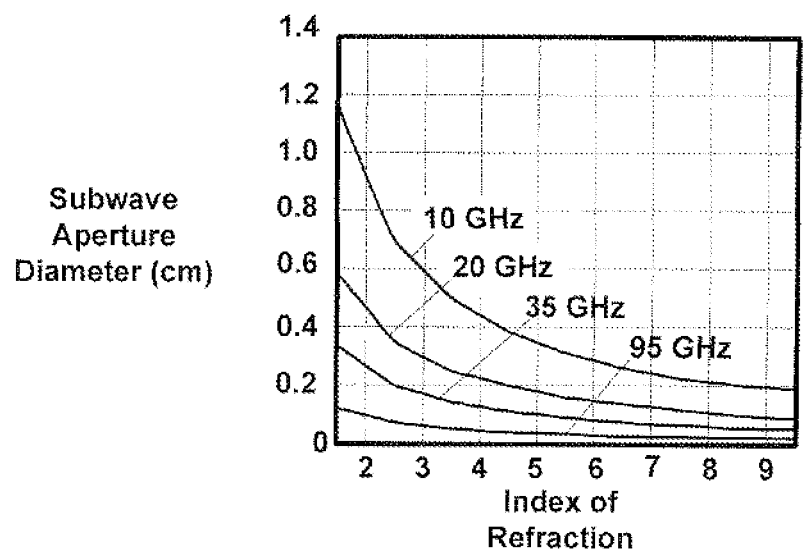
FIG. 20 graphs subwavelength aperture diameter versus index of dielectric layer and radio frequency employed.

FIG. 10A-FIG. 10B illustrate the particular embodiment 1000. The physics of surface plasmon polaritons will be discussed in association with FIG. 11A-FIG. 13. The generation of evanescent waves and their relation to surface Plasmon polaritons is discussed in association with FIG. 14-FIG. 17. FIG. 19-FIG. 20 illustrate the effects of the periodic surface features. FIG. 21A-FIG. 30B illustrate additional aspects of evanescent wave enhanced transmissivity.

The present discussion will be framed in the context of the embodiment 1000 of FIG. 10A-FIG. 10B. This embodiment 1000 uses a single aperture 1003 (only one indicated) per lens 1006 because of implementation specific size constraints. This particular embodiment includes 1.25" base diameter Von Karman radome 1009, and X-band illuminator. Size constraints are exacerbated when using concentric gratings such as the concentric rings 1008 (only one indicated) used in this particular embodiment given that resonance requires their period be on the order of the incident wavelength. Due to the common nature of electromagnetic theory, with some room for differences, phenomena observed in the optical regime have been shown to be scalable to the microwave with reasonable accuracy. See Schuchinsky, et. al., "Enhanced Transmission in Microwave Arrays of Periodic Sub-Wavelength Apertures", J. Opt. A.: Pure and Applied Optics S102-S109 (January 2005).

This particular embodiment employs the "plasmon physics" of plasmon polaritons. A discussion of the theoretical underpinnings for this phenomenon follows in association with FIG. 11A-FIG. 20. Coupling electromagnetic energy, such as the incident radiation 106, shown in FIG. 1 surface plasmon polaritons leverages their signal enhancement. Note the term "surface plasmon polariton" is used versus "surface plasmon" to avoid confusion with surface electrical currents known by this later description.

Surface plasmon polaritons result from freespace electromagnetic waves coupling to free electron oscillations (surface plasmons) in metals or semiconductors. As previously noted, some embodiments may have substrates fabricated from materials other than metals or semiconductors. However, these embodiments will not exhibit the generation of plasmon polaritons discussed here. Surface plasmon polaritons are essentially light waves trapped on the surface due to their interaction with electrons on the conductor—in this case light is said to be converted to the plasmon mode. Barnes et al., "Surface Plasmon Subwavelength Optics", Nature, 424, 6950, pg 824-830 (Aug. 14, 2003). Since metals or semiconductors support collective surface oscillations of free electrons, these collections can concentrate electromagnetic fields on the nanoscale, enhancing local field strength by several orders of magnitude. Plasmon characteristics can be accessed at optical and radio wavelengths.

The concept of surface plasmons originates in the plasma approach to Maxwell's equations. Atoms in mass such as metals have valence electrons that become conduction electrons approximately free to move about without collisions, known as a free-electron gas because they move like molecules in an ideal gas (sometimes referred to as an electron liquid). A free-electron gas is a plasma (not plasmon). As in any gas, longitudinal modes can be excited (like sound waves in air). The quantization of this longitudinal plasma wave (a density fluctuation) is called a plasmon or surface plasmon when the modes are confined as electrical currents on a smooth surface.

Figure 11A:
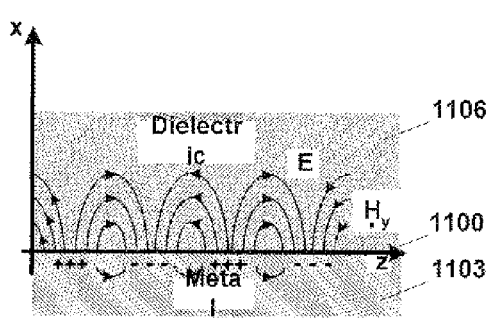
FIG. 11A-FIG. 11B conceptually illustrate surface plasmons at a metal surface.
Figure 11B:
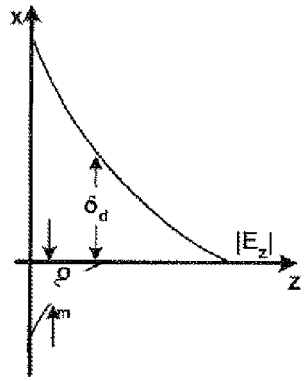

Referring now to FIG. 11A-FIG. 11B, FIG. 11A illustrates the behavior of surface plasmons at the interface 1100 between a metal 1103 and a dielectric 1106. Though resulting from electron density fluctuations, surface plasmons represent electromagnetic surface waves with their intensity maximum in the surface which exponentially decay away from that surface as shown in FIG. 11B. Notice in FIG. 11A that, surface plasmons have a definable wavelength. While normal propagating electromagnetic ("EM") waves have constant phase and amplitude in the same plane, waves such as those shown in FIG. 11A-FIG. 11B have planes of constant phase perpendicular to the interface, as shown in FIG. 11A, and planes of constant amplitude parallel to that interface, as shown in FIG. 11B.

Any dielectric material experiencing the forces of electromagnetic waves find their internal charge distribution separated, resulting in electric dipole moments which in turn contribute to the incident EM field. Primary responders are electrons followed by polar molecules. Even low inertia electrons fail to keep up with high frequencies at some point depending on material. This dependence is described by the index of refraction (or dielectric constant or relative permittivity) and is a function of EM frequency $\omega$. This dependence on index (or k, explained below) and on frequency $\omega$ (or wavelength $\lambda$) is called a "dispersion relation". (Recall that different colors of visible light travel at different speeds and bend at different angles in the same prism creating a rainbow—an expression of dispersion—because different $\lambda$'s experience different index.)

Figure 12:
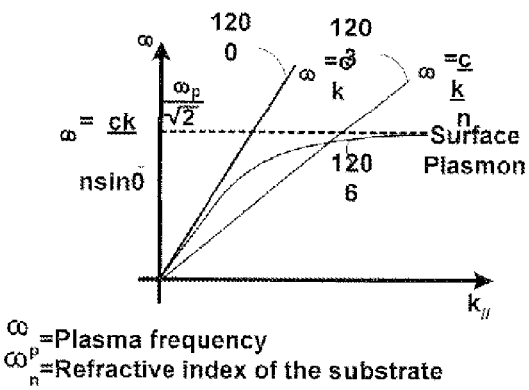
FIG. 12 shows dispersion relations as to radian frequency versus wavenumber for light in a vacuum, light in a transparent medium, and surface plasmons, respectively.

FIG. 12 shows several dispersion relations as $\omega$ (radian frequency) versus k (wave-number) for light in vacuum as $\omega=ck$ (trace 1200); light in some transparent medium with index of refraction n such that $\omega=ck/n$ (trace 1203); and that of surface plasmons (trace 1206), where $\omega_p$ is the plasma frequency of electrons in the material. Surface plasmons lie to the right of the freespace light line $\omega=ck$ implying that surface plasmons have shorter wavelengths than light. Since freespace light, ck, and surface plasmon dispersion relations do not intersect, light cannot directly excite (resonate) surface plasmons and surface plasmons cannot spontaneously radiate light. For a given frequency of freespace light the wavelength is set by $c=\lambda f$, but for the same given frequency surface plasmons have some other $\lambda$ and thus do not satisfy $c=\lambda f$.

Surface plasmons feel the effects of both media—the dielectric 1106 and the metal 1103, both shown in FIG. 11A. The surface plasmon wavelength then depends on properties of both materials at the interface of interest through the dispersion relation in terms of wavelength by $$\lambda_{sp} = \lambda \left[ \frac{\varepsilon_m + \varepsilon_d}{\varepsilon_m \varepsilon_d} \right]^{\frac{1}{2}} \tag{3}$$

where $\epsilon$ is the relative permittivity or dielectric constant in a metal m or dielectric d ($\sqrt{\epsilon}$=n the index of refraction). For metals, $\epsilon_m$ can be negative and both $\epsilon_m$ and $\epsilon_d$ are complex where the imaginary term quantifies absorption loss (though the imaginary component of $\epsilon_d$ is usually ignored for linear materials except under extreme conditions of high power). The dielectric function of a metal is $\epsilon_m$ _$\epsilon'+i\epsilon''$ and if we assume that $\epsilon''<|\epsilon'|$ we can create a complex $k_{sp}=k'_{sp}+ik''_{sp}$ where a surface plasmon wave-number has real and imaginary components.

Eq. (4) below is the same as Eq. (3) above, although expressed in terms of wave number $k=2\pi/\lambda$.

$$k'_{sp} = \frac{\omega}{c} \left[ \frac{\varepsilon'_m \varepsilon_d}{\varepsilon'_m + \varepsilon_d} \right]^{\frac{1}{2}} \tag{4}$$

$$k''_{sp} = \frac{\omega}{c}\left[\frac{\varepsilon'_m \varepsilon_d}{\varepsilon'_m + \varepsilon_d}\right]^{\frac{3}{2}} [2\varepsilon''^2_m] \quad (5)$$

Raether, "Surface Plasmons on Smooth and Rough Surfaces and on Gratings" (Springer-Verlag, 1988). For real $k'_{sp}$, we need $\varepsilon'_m < 0$ and $|\varepsilon'_m| > \varepsilon_d$, which is fulfilled by metals, such that, while $\varepsilon'_m$ has an absolute value greater than $\varepsilon_d$, $\varepsilon'_m$ and $\varepsilon_d$ have opposite signs. Note that the surface plasmon frequency is $$\omega_{sp} = \left[\frac{\omega_p}{1+\varepsilon_d}\right]^{\frac{1}{2}} \quad (6)$$

where $\omega_p$ is the plasma frequency under the assumption of a free electron gas. As the dielectric $\varepsilon_d$ increases, light $\lambda$ in a dielectric material decreases as k for light in that medium goes up. But from Eq. (6) the surface plasmon frequency decreases (its $\lambda$ increases). Implicit here is a potential match between the k's of both light and surface plasmons.

For the case of surface plasmons on a smooth planar metal, they display non-radiative electromagnetic modes, that is, surface plasmons cannot decay spontaneously into photons nor can light be coupled directly with surface plasmons. The reason for this non-radiative nature of surface plasmons is that interaction between light and surface plasmons cannot simultaneously satisfy energy and momentum conservation. In other words, the requirement for conservation of parallel momentum is not satisfied as represented by the momentum wave-vector k (its magnitude being k as noted, or more specifically $k_z$ along the horizontal z-plane defined by the dielectric/metal interface). "Spectroscopy of Gap Modes in Metal Particle-Surface Systems", Shinji Hayashi, pg 81, in "Near-Field Optics and Surface Plasmon Polaritons" (Satoshi Kawata Ed.) Springer, 2001).

When surface plasmons and light are made to be in resonance, the result is a "surface plasmon polariton" (surface plasmon polariton)—an electromagnetic field in which both light and electron wave distributions match in their $k_z$ momentum vector—they have the same wavelength. Resonance and field enhancement, can be made to take place if the light momentum wave-vector $k_z$ is increased as in a transparent medium with index of refractive n (trace 1102 FIG. 12) to match the surface plasmon momentum z-component wave-vector $k_{sp}$, or inversely resonance can be achieved by roughening the metal surface to decrease a surface plasmon's z-component $k_{sp}$ in order to match that, of freespace light $k_z$.

In practice, momentum restrictions are circumvented by either a prism coupling technique (to shorten light $\lambda$ thus increasing its $k_z$), or by a metal surface grating, nano-structures such as holes, dimples, posts or statically rough surfaces (to lengthen surface plasmon $\lambda$ thus decreasing its z-component $k_{sp}$). See Middle Tennessee University Physics Department, at http://physics.mtsu.edu/~wmr/surfplas.htm, http://www.mtsu.edu/~physics/.

Figure 13A:
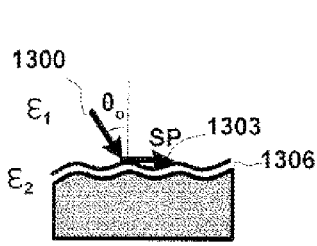
FIG. 13A-FIG. 13C illustrate the effect of corrugation and surface plasmon generation.
Figure 13B:
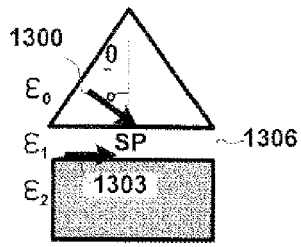
Figure 13C:
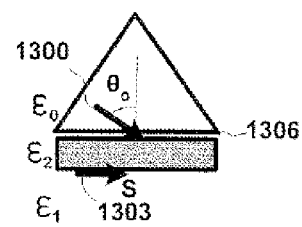

The corrugated method to matching is shown in FIG. 13A. The two prism coupling methods in FIG. 13A-FIG. 13B are known as attenuated total reflection ("ATR"), where incident electromagnetic, radiation 1300, 1303 is passed through an optically dense medium, increasing its wave-vector from what it was in air (a dielectric medium). This beam 1300 then reflects off the boundary 1306 between an optically less dense medium as in a narrow air gap (Otto configuration, FIG. 13B), or penetrates a metallic layer on the prism backface (Kretchmann-Raether configuration, FIG. 13C).

Figure 14:
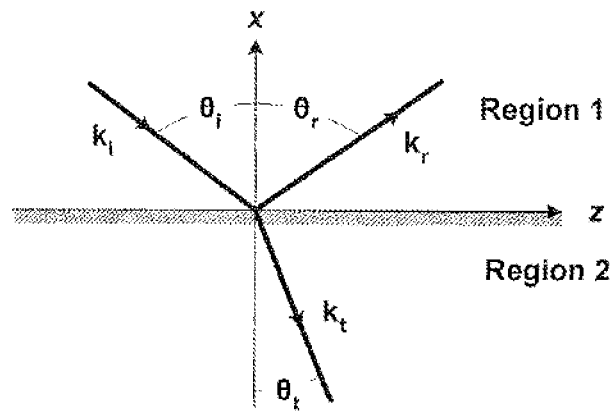
FIG. 14 illustrates assorted incident plane, vector & angle definitions.

Turning now to generation of evanescent waves, production of photon evanescent waves is described graphically by the k-vector approach shown in FIG. 14. A fuller discourse on the production of photon evanescent waves is presented in co-pending U.S. application Ser. No. 11/288,630, entitled "Evanescent Wave Coupling for Fresnel Direction Finding." filed in the name of Brett A. Williams (the '630 patent) and commonly assigned herewith. This application is hereby incorporated by reference as if expressly set forth verbatim herein. A shorter disclosure excerpted therefrom shall now be presented in order to further an understanding of the present invention.

FIG. 14 presents the arrangement of incident (i), reflected (r), and transmitted (t) energy. Each k-vector is defined in terms of its component in x and z with unit vectors for each axis as (positive x up, positive z right):

$$\bar{k}_i = -\bar{x}k_{ix} + \bar{z}k_{iz} \quad (7)$$

$$\bar{k}_r = \bar{x}k_{rx} + \bar{z}k_{rz} \quad (8)$$

$$\bar{k}_t = \bar{x}k_{tx} + \bar{z}k_{tz} \quad (9)$$

Figure 15:
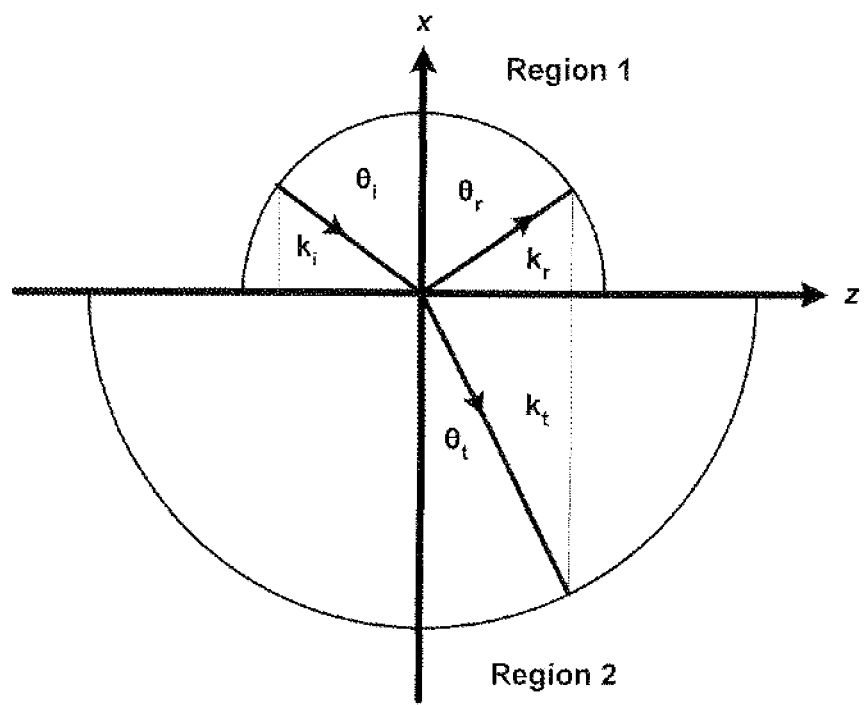
FIG. 15 illustrates k-Space for $n_1 < n_2$.

The projections of each k by sin and cosine can be seen from the drawing.

$$k_{ix} = k_1 \cos\theta_i, \; k_{iz} = k_1 \sin\theta_i \quad (10)$$

$$k_{rx} = k_1 \cos\theta_r, \; k_{rz} = k_1 \sin\theta_r \quad (11)$$

$$k_{tx} = k_1 \cos\theta_t, \; k_{tz} = k_1 \sin\theta_t \quad (12)$$

where $k_1$ and $k_2$ are k for their medium. Given that Maxwell's boundary conditions require continuous tangential components across that boundary (conservation of momentum vector), and that k is the same for both incident and reflected, this then means $\theta_i$ and $\theta_r$ must be the same and that:

$$k_r \sin\theta_r = k_2 \sin\theta_t \quad (13)$$

which is Snell's Law derived from Maxwell's phase matching. Additionally, if the waves in both Region 1 and Region 2 must satisfy the following dispersion relations:

$$k_1 = \sqrt{k_{ix}^2 + k_{iz}^2} \quad (14)$$

$$k_2 = \sqrt{k_{tx}^2 + k_{tz}^2} \quad (15)$$

which are equations for a circle, then one can graphically display what happens in k-space when $k_1 < k_2$ (index $n_1 < n_2$) as shown in FIG. 15. Since the z-components of all k's are equal by Maxwell's requirement at the interface and $n_1 < n_2$ then the magnitude of $k_2$ ($2\pi n_2/\lambda$) (also $k_t$ in the FIG. 15) is greater than $k_1$ and each traces out a half-circle in their respective region as shown.

Figure 16A:
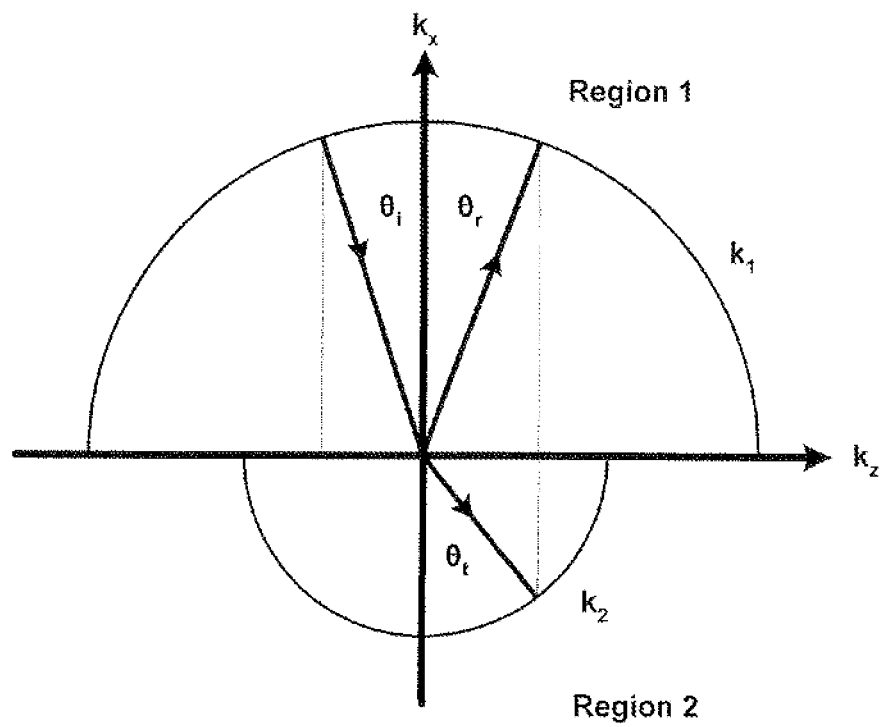
FIG. 16A-FIG. 16B illustrate k-Space for $n_1 > n_2$ and critical angle.
Figure 16B:
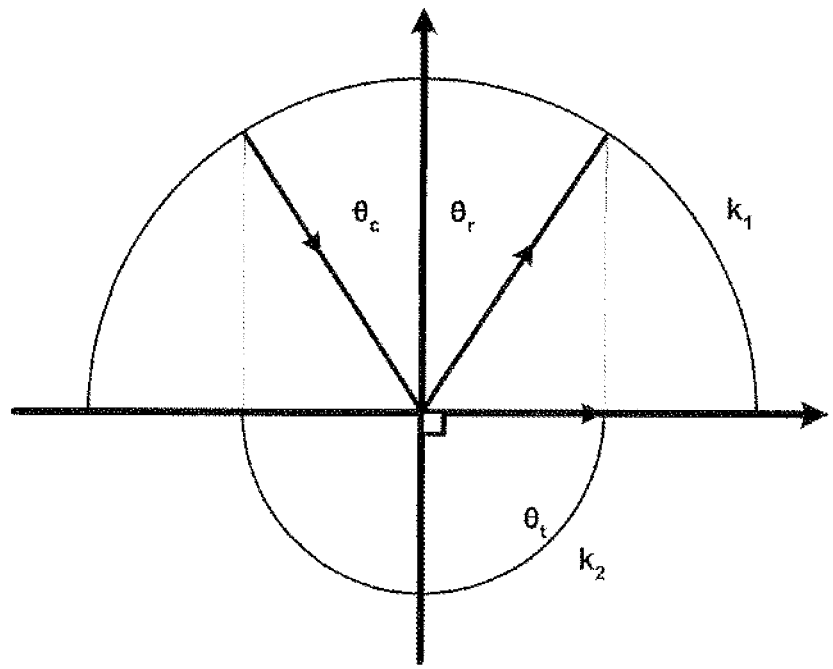

The case where $n_1 > n_2$, as shown in FIG. 16A-FIG. 16B is of most interest here. Note that the z-component of $k_1$ exceeds that of $k_2$ at and after the critical angle $\theta_c$ where $\theta_t = 90°$.

Finally one can ask what happens to k when $\theta_i > \theta_c$ with $n_1 \geq n_2$, which answered from the classical optics standpoint is, nothing. From the dispersion relation of Eq. (15) above, solving for $k_{tx}$ (down, into the next medium) one gets, $$k_{tx} = \sqrt{k_2^2 - k_{tz}^2} \quad (16)$$

Because of Maxwell's phase matching $k_{tz} = k_1 \sin\theta_i$ (projection of $k_1$ on z-axis) so that:

$$k_{tx} = \sqrt{k_2^2 - k_1^2 \sin\theta_i^2} \quad (17)$$

Note that $k_1 \sin\theta_i = k_2$ at $\theta_c$ (FIG. 16B because $\theta_r$ substitutes for $\theta_i$ given they're equal). If $k_1 \sin\theta_i > k_2$ then the square root is negative and $k_{tx}$ becomes imaginary.

$$k_{tx} = \pm j\sqrt{k_1^2 \sin\theta_i^2 - k_2^2} \equiv \pm j\alpha_{tx} \qquad (18)$$

The wave variation in Region 2 is of the form, see the '630 application, supra, (here along the x-axis)

$$e^{jk_{tx}x} = e^{j(\pm j\alpha_{tx})x} = e^{\pm \alpha_{tx}x} \qquad (19)$$

Since physically this function must not go to infinity when x goes to $-\infty$ the last term on the right is made to satisfy this requirement by a choice of positive sign in Eq. (19) and $$k_{tx} = -j\alpha_{tx}, \text{ when } \theta_i > \theta_c \qquad (20)$$

At last, Eq. (20) shows that the field falls off exponentially with distance from the interface as shown in FIG. 17 once $\theta_i > \theta_c$ where total internal reflection takes place.

Figure 17:
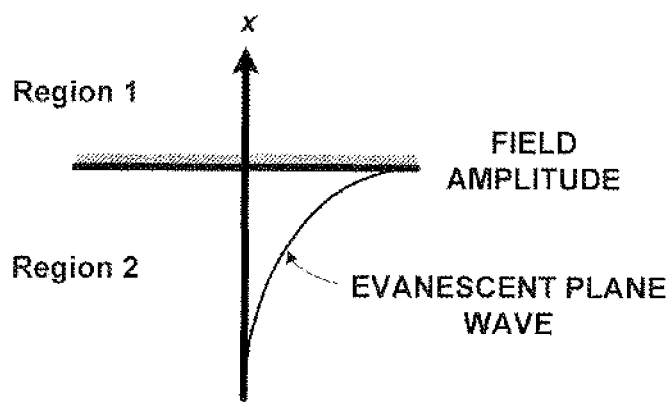
FIG. 17 illustrates evanescent wave amplitude.

FIG. 17 shows for photon evanescent waves the same exponentially decaying behavior we saw in FIG. 11B for surface plasmons. All three waveforms are evanescent—photon evanescent waves, surface plasmons and surface plasmon polaritons. Like "photon evanescent waves", surface plasmons propagate along the interface they are created on. While photon evanescent waves extend on the order of ~200 nm in the optical spectrum, they extend about $10^5$ times this value or ~2 cm in the RF region of X-band. Hecht, "Optics" $1^{st}$ Ed. 1979, Addison Wesley, pg. 84. Surface plasmon evanescent waves on the other hand may extend for meters.

For the illustrated embodiment, the RF coupling mechanism follows Lockyear, et al, "Enhanced Microwave Transmission Through a Single Subwavelength Aperture Surrounded by Concentric Grooves", J. Opt. A.: Pure and Applied Optics, 1/05, S152-S158. It employs both a single subwavelength aperture for evanescent wave coupling to the other side of a metal layer, and a two-sided surface grating for surface plasmon polariton enhancement of the illuminated side while diffraction focusing on the exit (inside the radome). Circular apertures in an opaque metal layer of diameter:

$$d < 1.841\frac{\lambda}{\pi} \qquad (24)$$

are unable to support propagating waveguide modes.

Thus, energy may only be transferred by the evanescent tunneling process leading to very weak transmission, which has been predicted to scale as $(d/\lambda)^2$. See H. A. Beth, "Theory of Diffraction by Small Holes", The Physical Review, Vol. 66, N 7 & 8, Oct. 1 & 15, 1944, pg. 163-182, specifically pg. 171.) (Lockyear, supra, states the exponent is 4 while the original paper he references by Beth states an exponent of 2, and thus is used here.)

Figure 18:
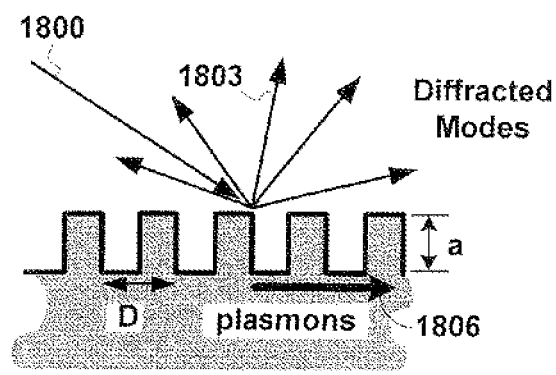
FIG. 18 is a cross-section of a circular grating and the diffraction of an incident beam.

A cross section of a circular grating with surface spatial periodicity D, is shown in FIG. 18, where grating spacing is close to incident radiation wavelength. The incident beam 1800 is diffracted producing propagating modes in diffraction orders 1803, which travel away from the interface while surface wave photon modes (photon evanescent waves) exist only at the interface, similar to those found at dielectric boundaries after total internal reflection. These modes have wave-vector components parallel to the interface with integer quanta of the grating wave-vector added or subtracted, depending on the direction of the diffracted order. For a grating pitch of D the grating wave-number is $k_g = 2\pi/D$, so the light wave-vector will be increased (or decreased) by $2\pi/D$ (for the $\pm 1^{st}$ order) and the dispersion relation of the surface plasmon component can be matched to that of a light wave-vector parallel to the interface (projection of lightwave k. i.e., $k_2 = k \sin\theta_o$, where $\theta_o$ is the RF incident angle). Notice it is the incident light that sees a k-vector shift, not the plasmons.

By virtue of a grating, evanescent photon modes couple to surface plasmons (1906), which run along the interface between the grating and supporting medium. The grating structure imposes an effective surface impedance as seen by incident RF. In other words, like light entering a dielectric, the light wavelength is changed permitting resonance with the plasmons in a manner analogous to a dielectric impedance leveraged by the Otto (FIG. 13B) or Kretschmann-Raether (FIG. 13C) configurations.

For an incidence angle $\theta_o$ and $\epsilon$ permittivity of the respective mediums the grating resonance condition takes the form:

$$k_z = \frac{\omega}{c}\sin\theta_o + \frac{2\pi}{D} = \frac{\omega}{c}\sqrt{\frac{\epsilon 2}{\epsilon 2 + 1}} \qquad (25)$$

where $\epsilon 2$ is the permittivity of the metal assuming air as $\epsilon 1 = 1$. FIG. 19A-FIG. 19B show a schematic representation of electric fields 1901. 1903 associated with surface plasmon modes propagating along the surface 1906, 1907 of a metal. At microwave frequencies, the metal is almost perfectly conducting, meaning in part, that the E-field vector at the air/metal interface is zero, i.e., the reflected transverse E-field is-pointed opposite that of the incident transverse field vector at the. interface for a net zero field result in the metal (for perfect conductors).

In FIG. 19A the field 1900 is completely excluded from the metal substrate 1909 but extends for many wavelengths into the dielectric region above making plasmons simply a surface current. In FIG. 19B the field 1903 meets a "metamaterial" 1910, penetrating some depth thanks to perforating the substrate with, an array of subwavelength apertures 1912 (only one indicated). An elementary discussion of metamaterials is found in Pendry, John B. & Smith, David R., "The Quest for the Superlens", *Scientific American*, pp. 60-67 (July 2006), which is hereby incorporated by reference for that discussion as if set forth verbatim herein.

Thus, in the illustrated embodiment, the subwavelength apertures 1003, shown in FIG. 10, cause the substrates to behave as if fabricated from a metamaterial. The apertures allow E-fields to decay exponentially into the structure as evanescent waves, and they closely resemble those of a surface plasmon propagating on metals. Hibbins, et al., "Experimental Verification of Designer Surface Plasmons", *Science*, Vol. 308, No. 5722, pg 670-672, 29 April 2005. These decaying E-fields are the "evanescent waves" discussed above. In the present case, the substrate 1015 is assumed to be far too thick to be penetrated. Instead, the evanescent waves propagate only by the subwavelength apertures. The subwavelength apertures 1003 in the metal substrate 1015 act as waveguides and therefore have a cutoff frequency below which no propagating modes are allowed.

The classical cutoff designation of the cutoff frequency defines the boundary between a small aperture (not shown) and a subwavelength aperture such as the apertures 1003 in FIG. 10. Below cutoff, only evanescent fields exist on the metal side of the air/metal interface. (Analogously, the incident field has been totally reflected at the surface. Under such conditions exceeding the critical angle, evanescent waves are established beyond dielectric barriers in the Otto (FIG. 13B) and Kretschmann-Raether (FIG. 13C) configurations. Here the incident waves arrive at normal incidence as tunneling is most efficient under those conditions.)

For the current interest in 10 GHz X-band of freespace 3 cm wavelength, from Eq. (3), diameters less than d=1.76 era (0.7") cannot propagate. For a dielectrically loaded guide with an index of refraction n=1.5 the wavelength becomes $\lambda_n$=2 cm and non-propagating d becomes 0.88 cm (0.35"). Table 1 and FIG. 20 survey subwavelength aperture diameters derived from Eq. (1.0) for four RF frequencies and a variety of dielectric constants. Naturally, higher frequency and higher index of refraction yield smaller apertures occupying less radome space but higher index also means greater reflection at the interface (more loss).

TABLE 1

Subwavelength Apertures v. Frequency & Index of Refraction

|  | X: 10 GHz | Ku: 20 GHz | Ka: 35 GHz | W: 95 GHz |
| --- | --- | --- | --- | --- |
| n = 1.5 | 11.7202 mm | 5.8601 mm | 3.3486 mm | 1.2337 mm |
| n = 2.5 | 7.0321 mm | 3.5161 mm | 2.0092 mm | 0.7402 mm |
| n = 3.5 | 5.0229 mm | 2.5115 mm | 1.4351 mm | 0.5287 mm |
| n = 4.5 | 3.9067 mm | 1.9534 mm | 1.1162 mm | 0.4112 mm |
| n = 5.5 | 3.1964 mm | 1.5982 mm | 0.9133 mm | 0.3365 mm |
| n = 6.5 | 2.7047 mm | 1.3523 mm | 0.7728 mm | 0.2847 mm |
| n = 7.5 | 2.3440 mm | 1.1720 mm | 0.6697 mm | 0.2467 mm |
| n = 8.5 | 2.0683 mm | 1.0341 mm | 0.5909 mm | 0.2177 mm |
| n = 9.5 | 1.8506 mm | 0.0009253 mm | 0.5287 mm | 0.1948 mm |

Lockyear, supra, has gone far to clarify the phenomena associated with this kind of transmission and provides information which makes the angle method used herein an enhancement to the NCFDF method, both phenomena using an amplitude versus incident angle response which allows for correlation between amplitude and angle. Depending on how the subwavelength aperture is placed, both methods can work together with the same amplitude versus angle behavior, though by vastly different means.

FIG. 21A-FIG. 21B provide Lockyear's design on a flat plate 2100 which the embodiment 1000 of FIG. 10 will, in part, emulate. The coupling mechanism of the embodiment 1000 in FIG. 10 is based on the concentric, or "bull's eye", grating of Lockyear, and Lezec, et al., "Beaming Light from a Subwavelength Aperture", 297 *Science* 297, 820-822 (Aug. 2, 2002), before him. FIG. 21A shows the concentric circles 2103 (only one indicated) of the bull's eye grating 2101 surrounding a subwavelength aperture 2110 in a perspective view. FIG. 21B shows the aperture 2110 and a ring 2103 in a fragmented cross-sectional view. Initial computational modeling demonstrated that the attenuation of the transmitted signal through Lockyear's aperture 2110 was too high for signal detection; hence, he countersunk the aperture 2110 driving the hole thickness toward zero at its metal boundary. This allows for a sufficiently deep surface grating 2101 on both the illuminated and exit sides 2112, 2113 of the plate 2100 when the metal substrate thickness (h) is chosen to be 1.50 mm.

The grating pitch (or period or constant) was set to 5 mm, which was chosen because when the grating wave-number, $k_g=2\pi/\lambda_g$ matches that of the incident light then resonance is a maximum—thus the resonant frequency used was 60 GHz. The aperture diameter is shown as 2.5 mm (half the illumination wavelength), material thickness of aluminum is 1.5 mm, groove depth 1 is 0.55 mm, and width of groove is 1.5 mm. Also shown is a cross section through the structure on one side of the hole and the first grating peak as well as defining where is z=0.

Lockyear actually tested four surface patterns. The four surfaces used by Lockyear to test are shown in FIG. 22A-FIG. 221). FIG. 22A shows two smooth surfaces 2200, 2201 with no corrugation on either side. FIG. 22B-FIG. 22C have one sided corrugation allowing the corrugated sides 2204, 2205 to face toward or away from the RF source. (The experiment revealed very different phenomena of enhancement on the illuminated side versus strong focusing on the exit side.) FIG. 22D shows corrugation on both surfaces 2208, 2209. Source incident angle of θ and transmission angle ψ are shown with respect the z-axis through the aperture 2110 are shown in FIG. 21. Light is E-polarized in the xz-plane.

Figure 23A:
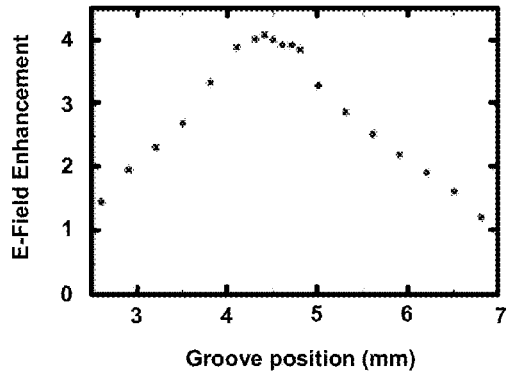
FIG. 23A-FIG. 23D graph E-field enhancement as a function of groove position, groove depth, groove width, and number of rings for use in groove tuning.
Figure 23B:
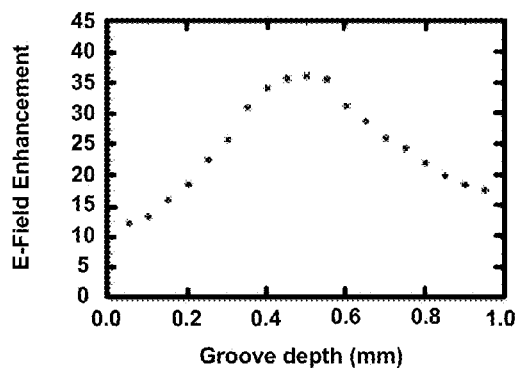
Figure 23C:
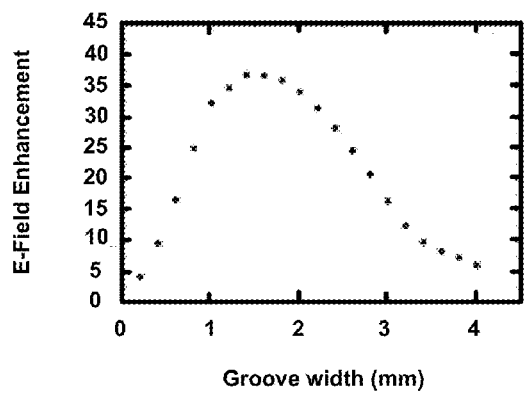
Figure 23D:
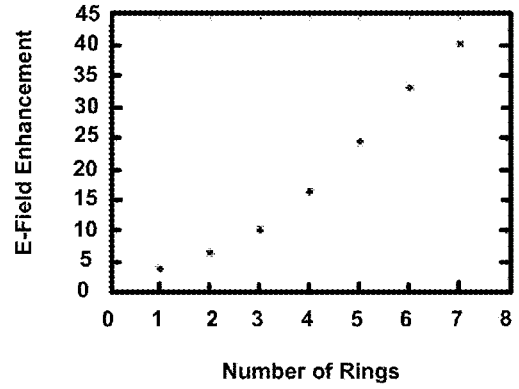

FIG. 23A-FIG. 23D show how grooves of the grating 2101 were tuned. With the source frequency set to 60 GHz the E-field enhancement was monitored. FIG. 23A varies groove position, FIG. 23B varies groove depth, FIG. 23C groove width and FIG. 23D the number of grooves. This then results in an RF surface prescription for Lockyear's material and frequency of choice noted above. Note that subsequent analysis was constrained to a plate 2100 with four concentric rings 2103 in order to improve convergence and reduce computation time.

Figure 24:
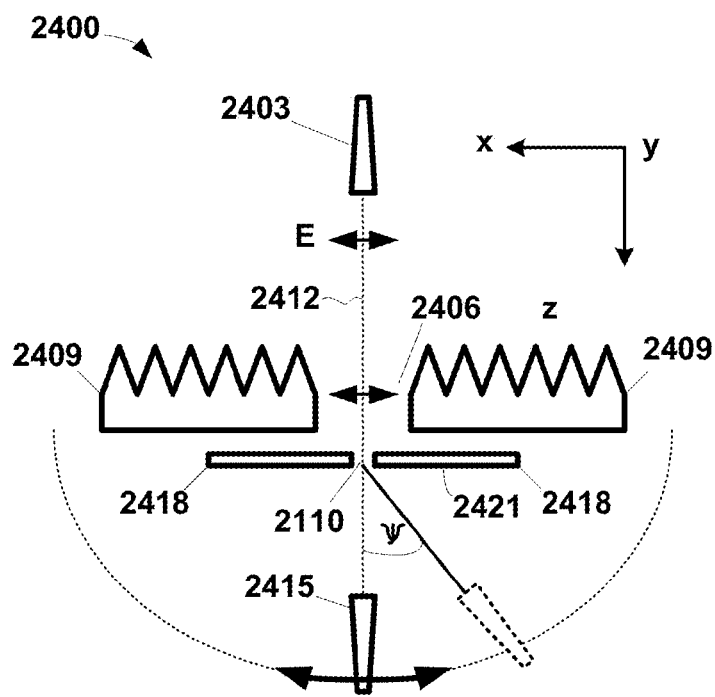
FIG. 24 illustrates an experimental test setup.

FIG. 24 illustrates Lockyear's test setup 2400, which is a good source for the arrangement of the presently illustrated embodiment. Though the source antenna 2403 appears fixed at normal incidence, it is later moved to three additional incident angles. Radiation is normally incident upon the plate 2100 (θ=0°), and polarized such that the electric field vector E is in the x-direction. The structures were milled into 300×300×1.5 mm aluminum alloy sheet, the edges of which were covered with microwave absorbing material 2409 to reduce stray signals.

The source antenna 2403 is positioned a perpendicular distance of 0.6 m from the sample plate 2100 and oriented such that the incident electric vector E is in the x-direction. The sample plate 2100 is mounted in a wooden holder (not shown) and positioned over the center of rotation of a computer-controlled turntable (not shown). A 45×45 mm aperture 2406 formed from microwave absorbing material 2409 is positioned between the source antenna 2403 and the plate 2100 to restrict the beam 2412 to a well collimated central part. A detector antenna 2415 is mounted on an arm (not shown) extending from the computer-controlled turntable and positioned a perpendicular distance of 0.35 m from the exit side 2421 of the sample plate 2100.

Figure 25:
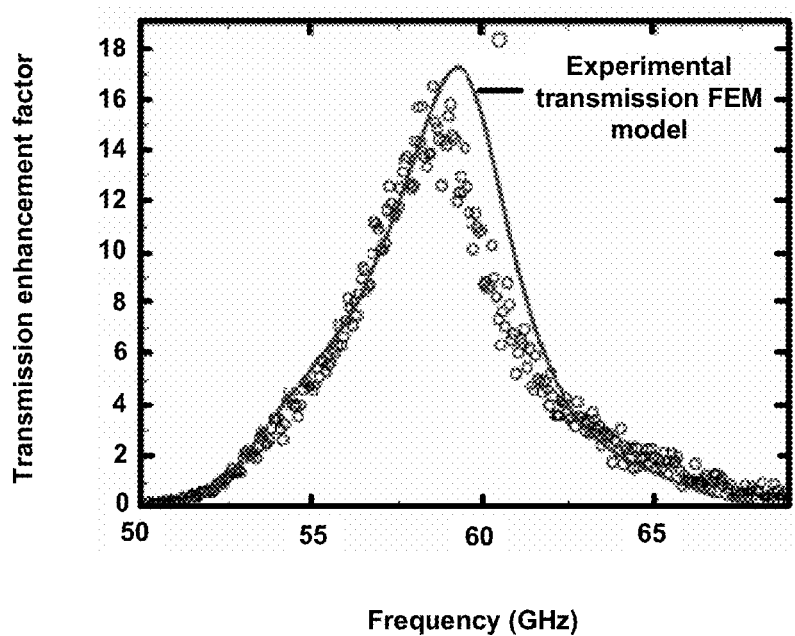
FIG. 25 graphs a transmission enhancement factor as a function of frequency for the structure of FIG. 22C.

In FIG. 25, the surface 2205 of FIG. 22C with corrugation facing the source antenna 2403 is measured and modeled. Results are normalized to the surface 2200 of FIG. 22A with no corrugations. Both transmit and receive antennas 2403, 2415 are normal to their respective surfaces. The illumination-side grating accounts for a 17-fold enhancement, or 12 dB over the bare aperture 2100 of FIG. 22A and its theoretical transmission noted by Beth, supra.

Figure 26B:
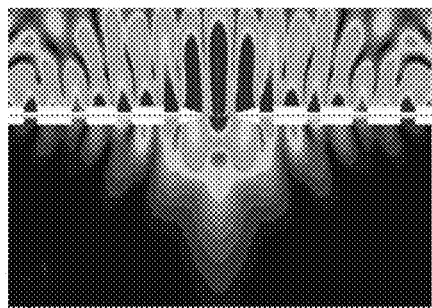
FIG. 26A-FIG. 26B depicts modeled H & E fields at resonance.
Figure 26A:
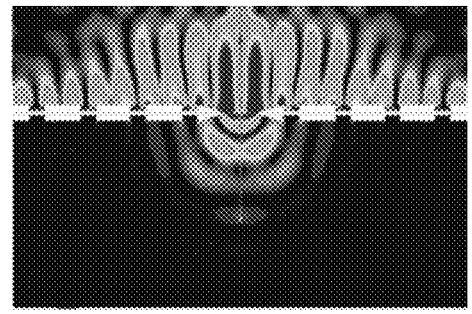

FIG. 26A-FIG. 26B shows that scattering of incident radiation by the concentric grooves of the plate 2100 results in a redistribution of EM fields such that regions of high energy density are located in the vicinity of the aperture 2100. The E-field is shown in FIG. 26A to possess maxima, located at sharp corners of each concentric groove, with maximum enhancement (in this case 25-fold) occurring at the sharp ring formed by countersinking of the aperture entrance. The H-field, shown in FIG. 26B, however has maxima located centrally on each peak and trough of the profile. Note also that magnitudes of both E- and H-fields in the xz-plane decay as a function of distance away from the aperture (evanescent).

Figure 27:
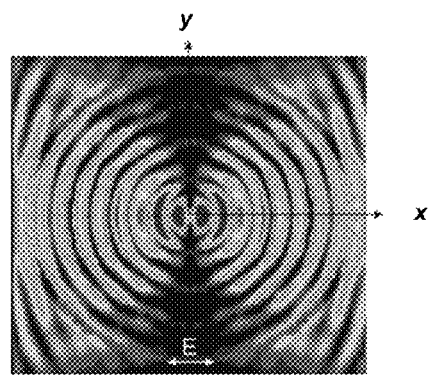
FIG. 27 depicts a modeled time averaged E-field at a grating top surface (z=0)

In FIG. 27 the surface wave is not concentric but dependent on incident polarization, implying that some embodiments need not have continuous rings although that would limit the polarization angle. With continuous rings, an embodiment would be polarization independent, accepting the E-field at an angle rotating about the aperture, though the RF-feed pickup would also have to be sensitive to any incoming polarization (circular).

Lockyear, supra, goes on to show a 16% enhancement clearly due to surface plasmon polaritons because he models the aperture and grating on both a perfect dielectric, perfect conductor, and aluminum. While the dielectric grating will still diffract, it cannot provide free electrons for surface plasmon modes. The metal can and does display a gain resulting from surface plasmon polaritons. To summarize, Lockyear finds a pseudo-standing wave formed via diffraction, resulting in a redistribution of energy density such that regions of high energy density are located in the vicinity of the aperture. Surface plasmon polariton enhancement of the evanescent fields occurs for metals, but accounts for less than a quarter of the overall enhancement in transmission in his study. Grating the illuminated surface provides enhancement while grating the inner surface focuses the incoming beam as shown in FIG. 28 below.

Figure 28:
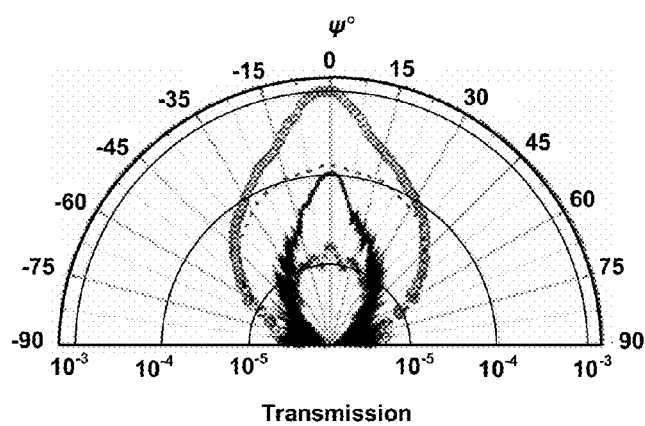
FIG. 28 illustrate enhancement and beam narrowing resulting from grating the illumination and exit sides of the plate in FIG. 21A.
Figure 29A:
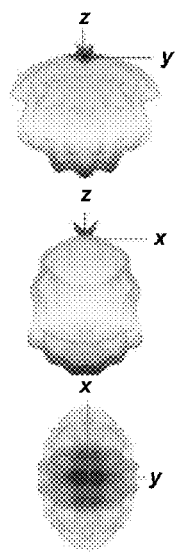
FIG. 29A-FIG. 29B depict an aperture exit power pattern with a grating outside surface only and a grating both sides, respectively.
Figure 29B:
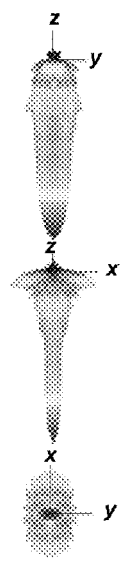
Figure 30A:
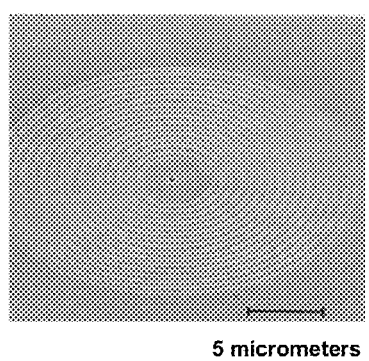
FIG. 30A-FIG. 30C show the effect of grating period errors about a subwavelength aperture at optical wavelengths.
Figure 30B:
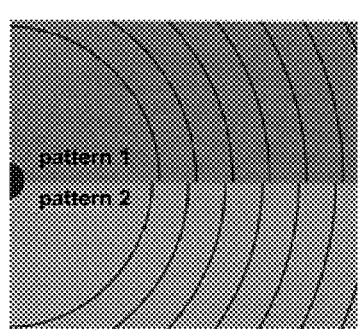
Figure 30C:
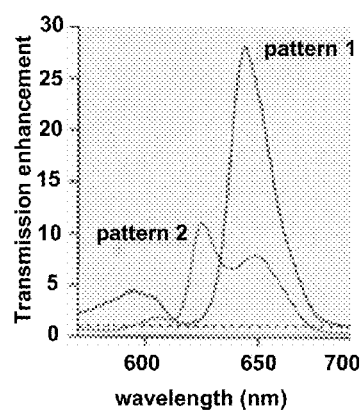

Lockyear notes that although the results of FIG. 28 suggest that plate 2100 with a surface 2204 shown in FIG. 22B transmits more than plate 2100 with surfaces 2200, 2201, shown in FIG. 22A, modeling of the absolute transmission normalized to the area of the hole suggests they are equally efficient. The apparent increase in transmission efficiency is because Lockyear's detector antenna 2415, shown in FIG. 24, is only able to detect radiation entering close to normal to its front face. Further, diffraction of the beam 2412 occurs not only in the xz-plane but in all directions over a wide range of angles, as one would expect for a circular hole and shown in FIG. 29A-FIG. 29B where absence of an exit grating (but presence of an illumination-side grating) results in wide beamwidths (FIG. 29A), while presence of an exit grating focuses the beam 2412 (FIG. 29B). The inside grating forces the signal to exit the aperture 2110 normal to the surface plane largely irrespective of incident angle. See Lockyear, supra, p. S158.

Returning now to FIG. 10, the illustrated embodiment comprises a subwavelength aperture 1003 in a metal radome 1009, with illuminate and exit side concentric gratings 1008 and a dielectric medium 1012 encasing both, filling the subwore aperture 1003 and extending into the radome volume (not shown). Employing a subwavelength aperture 1003 allows an extended range of long wavelengths that may be passed evanescently—albeit with increasing loss—that a waveguide would otherwise reject if below its cutoff. The dielectric medium 1012 serves several purposes. First, it shortens the RF wavelength in dielectric medium 1012 allowing us to reduce grating period which matches incident wavelength in the dielectric medium 1012, and shrinks the subwavelength aperture 1003, both satisfying limited radome real estate constraints. Second, it also serves to increase the number of grating groves, improving enhancement as described by Lockyear and shown in FIG. 23D. Third, it improves accuracy at the expense of reflection loss, once again, through the Fresnel operation employed by NCFDF as disclosed in the '645 patent incorporated above.

Although one would rather not take the Fresnel loss, not only must space restrictions be satisfied but also constraints on subwavelength apertures and their gratings prefer normal incidence RF or light. One cannot provide this on such a strongly curved surface and still see forward without the dielectric medium 1012, which translates a 20° freespace FOV into a dielectric transmitted ray varying by only 3° onto the grating/aperture. While tolerances at optical wavelengths are strict as implied in FIG. 30A-FIG. 30C, such precision is relieved by a factor of wavelength increase over optical at RF wavelengths. FIG. 30A-FIG. 31C show the effect of grating period errors about a subwavelength aperture at optical wavelengths.

Note that these are implementation specific considerations for the illustrated embodiment. Alternative embodiments may balance these types of constraints differently. For example, some embodiments may not have such tight size and shape constraints for their radome 1009.

Figure 31A:
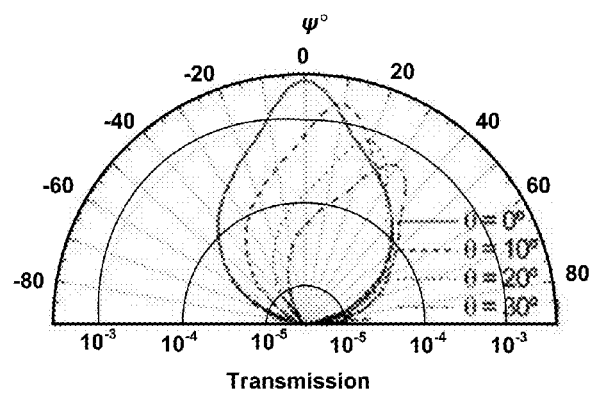
FIG. 31A-FIG. 31B graphs exit power reduction with incidence variation and plots the transmission amplitude as a function of incident angle.
Figure 31B:
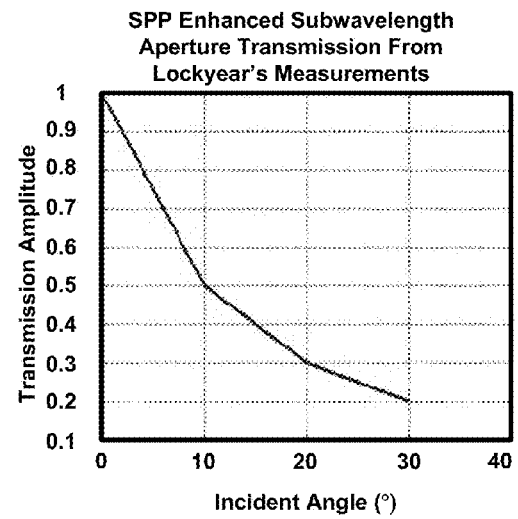

Unlike hemispherical radiation, equal in amplitude in all directions from each antenna element, the antenna of FIG 10A-FIG. 10B primarily provides a steep amplitude versus angle variation per receiving element provided by the interaction between its subwavelength aperture and surface grating as shown in FIG. 31A-FIG. 31B for the cases shown in FIG. 22D with gratings on both sides 2208-2309. Here the incident angle is varied over steps (0°, 10°, 20°, 30°) tracing out an effective beamwidth as roughly shown at right for the only values available from the plot in FIG. 31A.

Lockyear's tuning shown in FIG. 23A-FIG. 23D provides values for grating structures as shown in Table 2 (through scaling). Scaling the values to a 10 GHz freespace wavelength from Lockyear's 60 GHz yields a factor of 0.5 cm/3 cm=6.0 shown in the 10 GHz freespace column. The same structure components are shown also for several index of refraction values imposed on the dielectric layer. Note that per FIG. 23A - FIG. 23D, tolerances are ±0.001 inch.

TABLE 2

Grating Structure Comparison

|  | 60 GHz | 10 GHz Freespace | 10 GHz, n = 1.5 | 10 GHz, n = 3 |
| --- | --- | --- | --- | --- |
| Grating Pitch, $\lambda_g$ | 5 mm | 30 mm | 20 mm | 10 mm |
| Grove Width, w | 1.5 mm | 9 mm | 6 mm | 3 mm |
| Grove Depth, l | 0.55 mm | 3.3 mm | 2.2 mm | 1.1 mm |
| Hole diameter, d | 2.5 mm | 15 mm | 10 mm | 5 mm |
| Factor per 60 GHz | 1 | 6 | 4 | 2 |

|  | 10 GHz, n = 4.5 | 10 GHz, n = 5.5 | 10 GHz n = 6.5 | 10 GHz, n = 7.5 | 10 GHz, n = 8.5 |
| --- | --- | --- | --- | --- | --- |
| Grating Pitch, $\lambda_g$ | 6.7 mm | 5.35 mm | 4.62 mm | 4 mm | 3.53 mm |
| Grove Width, w | 2 mm | 1.64 mm | 1.39 mm | 1.2 mm | 1.06 mm |
| Grove Depth, l | 0.73 mm | 0.6 mm | 0.51 mm | 0.44 mm | 0.39 mm |
| Hole diameter, d | 3.33 mm | 2.73 mm | 2.31 mm | 2.0 mm | 1.77 mm |
| Factor per 60 GHz | 1.33 | 1.09 | 0.92 | 0.8 | 0.71 |

Figure 32:
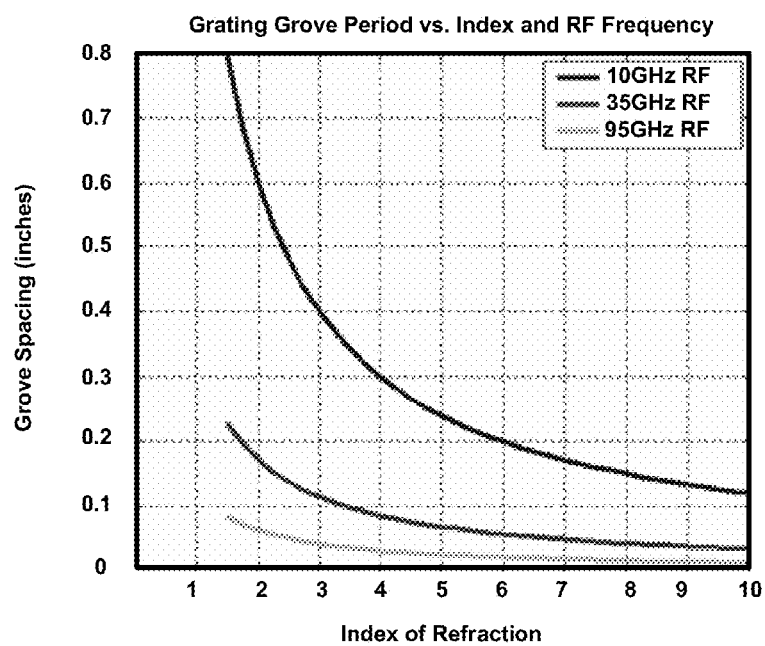
FIG. 32 graphs the grating period versus index and frequency.

Notice a difference between values of Table 1 (based on Eq. (3)) and Table 2 based on scaling. For 10 GHz, index n=1.5 and n=3.0, Eq. (3) gives aperture d=11.7 mm and 5.86 mm respectively, both a 17.2% difference with Table 2 (using Table 2 values as the divisor). A trade between groove number, increased by elevated dielectric constant, its associated loss and decrease in NCFDF monopulse angle accuracy is required for each radome application and its RF frequency. FIG. 32 shows the beneficial effects on groove surface spacing (radome real estate) versus dielectric constant for 10, 35 and 95 GHz.

Figure 33:
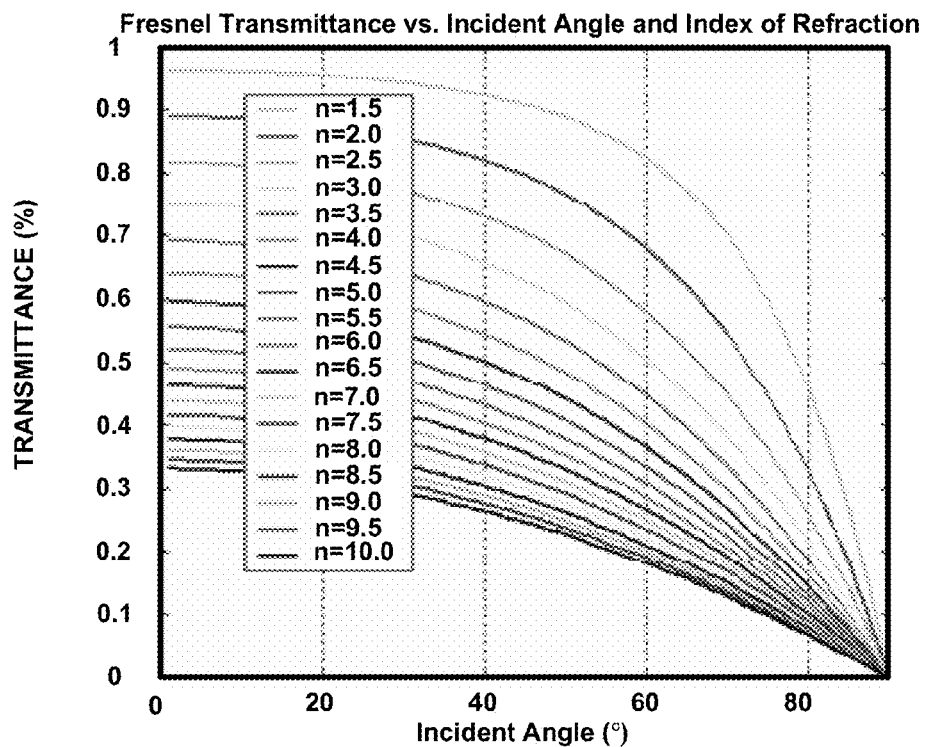
FIG. 33 graphs Fresnel transmittance versus index of refraction and incident angle.

FIG. 33 shows the detrimental effects of increasing index on what would be both reflection loss (for higher index-i.e., greater impedance mismatch) and reduced magnitude versus angle slope independent of frequency, thus reducing track accuracy.

The illustrated embodiments therefore assist NCFDF monopulse angles by adding the change in amplitude versus angle of the subwavelength aperture response to the NCFDF response. Though the illustrated embodiments provide a resonance phenomena, they create a pattern analogous to aperture beamwidth. Like classical monopulse antennas which use an amplitude versus angle relation as null seekers, it will make use of the resonance beamwidth for the same purpose. (This also means one could angle-find with the present invention without the dielectric layer 1012 and therefore without NCFDF.) One therefore chooses an angle at which to position the subwavelength aperture 1003 and grating 1008 at some angle with respect to (and beneath) the dielectric medium 1012.

For current trajectories of interest for the illustrated embodiment, the target tends to be seen at 20° to 30° off boresight at launch. Thus, it is these angles at which the platform should see the farthest. By facing the subwavelength aperture 1003 and grating 1008 in a manner such that normal subwavelength aperture incidence results from a ray refracted from a target one can tune detection range performance.

Figure 34A:
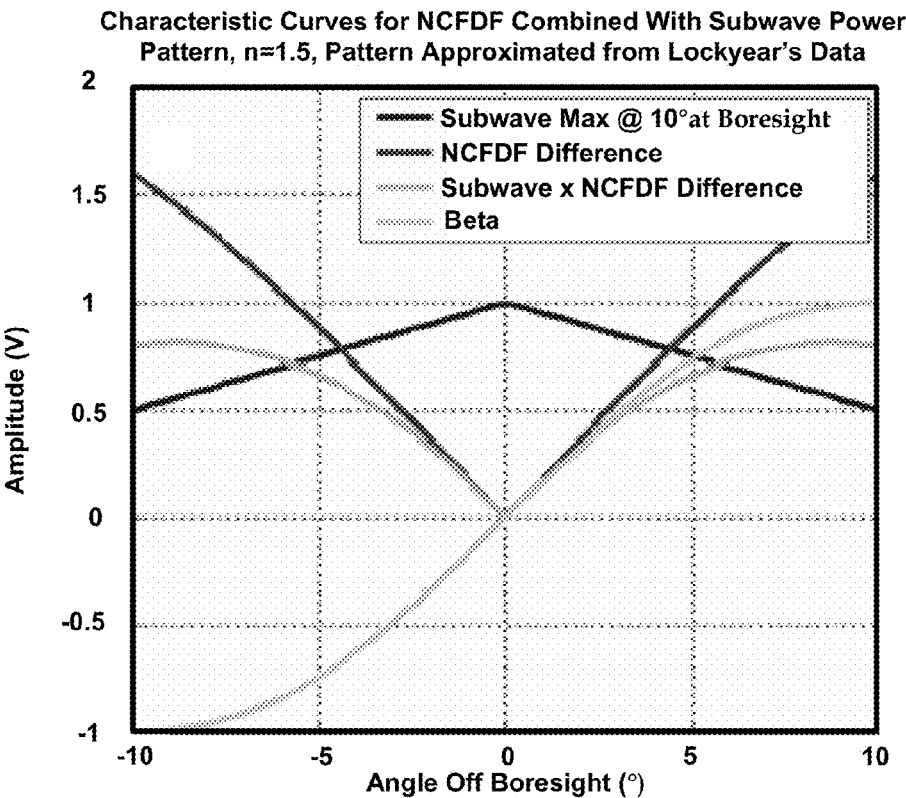
FIG. 34A-FIG. 34C graphs a variety of quantities.
Figure 34B:
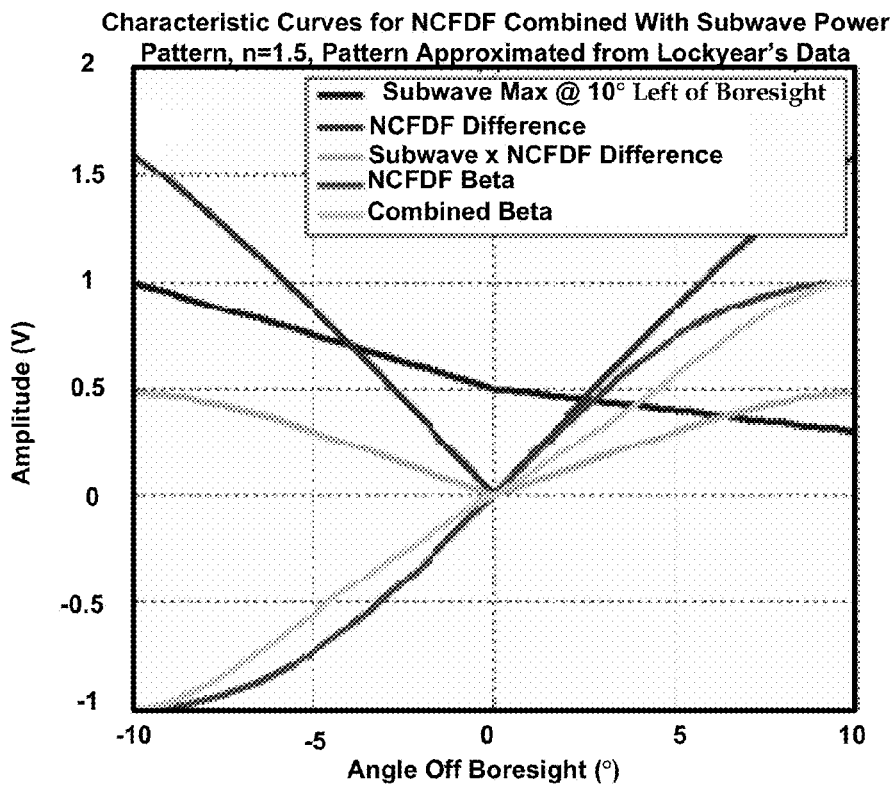
Figure 34C:
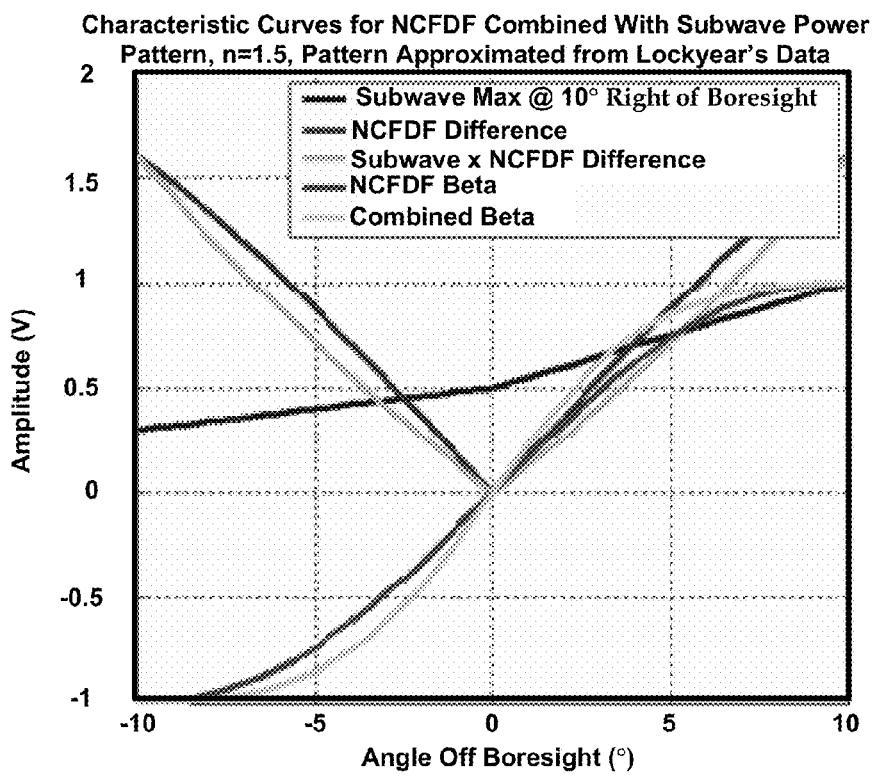

Slight variations in accuracy can be seen in the slopes of FIG. 34A-FIG. 34C using the ("SRHIT") factor of 0.33V/degree slope as equivalent to O.5 mrad track accuracy as shown in Table 3. Accuracy can be slightly improved if the subwavelength aperture peak amplitude (beam center) is directed to 10° right of boresight (from the perspective of the left side), i.e., place it at along the radome surface. However, this arrangement incurs loss for all angles away from the nose-especially of concern at long range since simulations show large look angles at long range for anticipated trajectories. Given the small accuracy improvement and desire for range performance aligning the subwavelength beam on boresight as shown in FIG. 34A is the compromise, though some designs may choose otherwise.

TABLE 3

Accuracy Comparison

| FIG. 35A, Peak Forward | | FIG. 35B, Peak Left | | FIG. 35C, Peak Right | |
|---|---|---|---|---|---|
| NCFDF | Combined | NCFDF | Combined | NCFDF | Combined |
| 1 mrad | 1 mrad | 1 mrad | 1.5 mrad | 1 mrad | 0.9 mrad |

Figure 35:
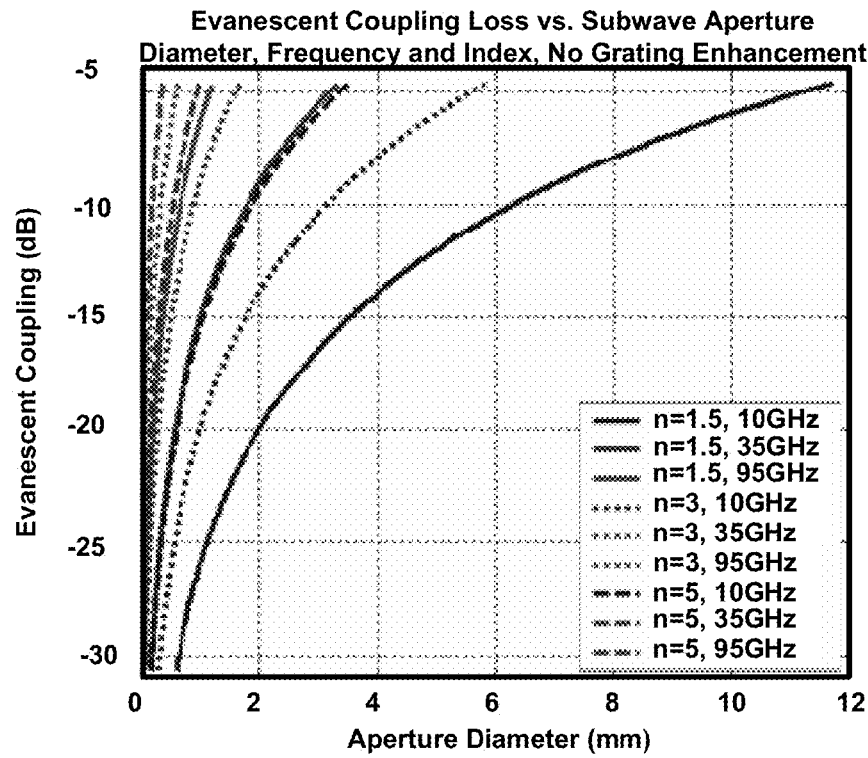
FIG. 35 graphs subwavelength evanescent coupling loss versus frequency, diameter, index.

According to Beth, supra, radiation intensity falls off with subwavelength aperture by $(d/\lambda)^2$. FIG. 35 shows the falloff of RF output at X-band, Ka and W-bands versus index of refraction and variation in diameter over a range of values beginning at the max subwavelength aperture limit of $d=1.841\lambda/\pi$ of Eq. (10), decreasing to $1/20^{th}$ of this upper size limit. Note that $\lambda$ is that within the dielectric medium. While tight surface space limitations are best suited by small apertures, power behaves as always with more loss as the apertures shrink.

Figure 36:
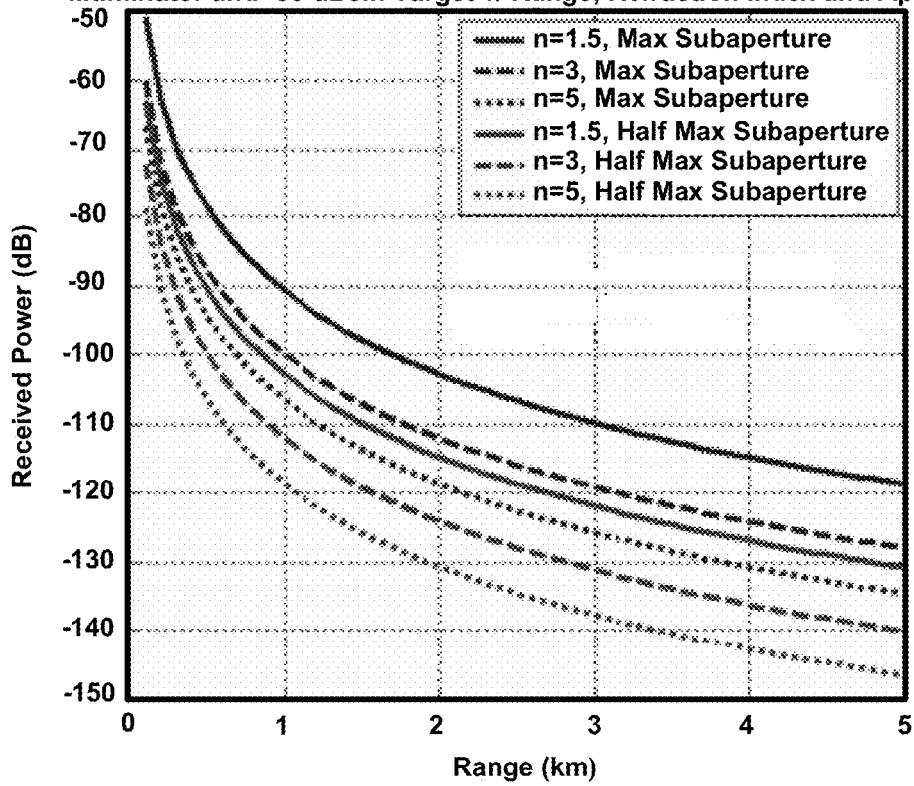
FIG. 36 graphs received peak power versus range, index, and aperture.

Combining this loss with Fresnel loss, subwavelength beamwidth behavior and illumination-side grating enhancement of 10 (Lockyear and others approach or exceed 100), one can calculate approximate received peak power for the embodiment of FIG. 10 as shown in FIG. 36 where index and aperture have also been varied. The type of receiver used—RF or photonic—will set noise floor and gains resulting in signal-to-noise ration ("SNR") versus range performance.

Several other options and their combination are available to increase range, including 1) increasing ground radar output power, 2) adding a low noise RF to the output of the RF-feed, and 3) combining the present invention with attenuated total reflection coupling for additional plasmon amplification. Hence another purpose served by the dielectric medium 1012 which fills a cavity behind the subwavelength aperture 1003, mated to a design attenuated total reflection coupling of a smooth thin metal film with a rough surface or periodic structure on its far side away from the aperture facing an RF pick-up.

The present invention, in the embodiment of FIG. 10, therefore provides radar illuminator power rejection due to the near-normal incidence of the subwavelength aperture 1003 and gratings 1008. Physical characteristics of subwavelength apertures present a series of tradeoffs as shown in Table 4.

TABLE 4

| Subwavelength Tradeoffs | |
|---|---|
| Index Of Refraction | High = small features, more gratings, more loss, lower accuracy |
| Gratings | More = greater signal enhancement, more surface space required |
| Subwavelength Aperture | Smaller = less surface space, greater coupling loss |
| Radio Frequency | Higher = smaller features, higher atmospheric loss, fewer $3^{rd}$ party illuminator assets in the field, lower transmit power but higher illuminator antenna gain |

Thus, the embodiment of FIG. 10 presents another option for FOV rejecting, angle only measurement, addressing space limitations on miniature missiles with a surface conformal structure on sleek, low drag radomes, clearing the central axis for lethality. It is applicable to both radio and optical regions of the electromagnetic spectrum and suffers from the same monopulse centroid noise induced by multipath. As with all NCFDF-based devices, the accuracy is independent of aperture size and wavelength as long as index of refraction is a constant. Also as with all NCFDF devices, lens foreshortening in the optical domain adds to accuracy at the expense of increased loss due to reduced aperture surface exposure to incoming light at the first interface where the NCFDF method is leveraged. While surface plasmon polaritons and diffraction provide enhancement, photon tunneling (evanescent coupling) produces loss, dependant on aperture size.

Note that the technical discussion presented above relative to FIG. 11A-FIG. 36 pertain to the embodiment of FIG. 10. However, as is discussed above, the present invention admits wide variation in many aspects. For example, the grating 1008 may be implemented as shown in FIG. 5A-FIG. 5C or omitted altogether. Those ordinarily skilled in the art will be able to readily extrapolate from that discussion to make and use numerous alternative embodiments.

Note also that the terminology used herein and in the claims below may at times reflect the end use of a given embodiment. For instance, the invention is employed at RF frequencies on a missile. Use at RF frequencies mitigates for the use of the word "lens" over "window", which might be used at optical frequencies, because the term "lens" are used in both RF and optical systems. However, in optical systems, the "lenses" 301, 302 of the radome 300, shown in FIG. 3A-FIG. 3B, may be referred to as "windows" and the "lensing system" as a "windowing system".

Similarly, both these factors mitigate for the use of the term "radome" although there is no need for a "radome", as such, in all embodiments. The radome 300 performs several functions noted above in the illustrated embodiment. With respect to the present invention, however, the radome 300 defines the geometry of the lenses 301, 302 with respect to the incident radiation. The geometry, in turn, impacts whether direction finding can employ NCFDF in the given embodiment. Thus, any suitable means known to the art for defining that geometry may be employed given the implementation-specific constraint for a particular embodiment. Accordingly, the radome 300 is, by way of example and illustration, but one such determining means.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
receiving optical frequency or radio frequency energy through a pair of fixed, foreshortened, and opposing subwavelength apertures in a lensing system, wherein a tens of the tensing system positions at least one of the subwavelength apertures and includes:
a dielectric medium; and
a substrate encased in the dielectric medium and defining at least one of the subwavelength apertures; and
determining a target angle from the steep change of amplitude versus angle presented by the aperture's beamwidth from the received energy;
wherein the determining is performed by a processor.

2. The method of claim 1, wherein the received energy is optical frequency energy.

3. The method of claim 1, wherein the received energy is radio frequency energy.

4. The method of claim 1, wherein the lensing system includes a pair of foreshortened lenses.

5. The method of claim 1, wherein the lensing system is positioned in a radome.

6. The method of claim 1, wherein the substrate defines a periodic surface feature on at least one of the illumination side and the exit side thereof.

7. The method of claim 1, wherein the lensing system includes a non-reflective coating.

8. The method of claim 1, wherein receiving the energy through the opposing subwavelength apertures includes receiving the energy through an evanescent wave coupling.

* * * * *

UNITED STATES PATENT AND TRADEMARK OFFICE
CERTIFICATE OF CORRECTION

| | | |
|---|---|---|
| PATENT NO. | : 8,581,775 B2 | Page 1 of 1 |
| APPLICATION NO. | : 12/832709 | |
| DATED | : November 12, 2013 | |
| INVENTOR(S) | : Brett A. Williams | |

It is certified that error appears in the above-identified patent and that said Letters Patent is hereby corrected as shown below:

In the Claims

Col. 26, claim 1, line 5-16 replace:

"A method comprising: receiving optical frequency or radio frequency energy through a pair of fixed, foreshortened, and opposing subwavelength apertures in a lensing system, wherein a tens of the tensing system positions at least one of the subwavelength apertures and includes:" with -- "A method comprising: receiving optical frequency or radio frequency energy through a pair of fixed, foreshortened, and opposing subwavelength apertures in a lensing system, wherein a lens of the lensing system positions at least one of the subwavelength apertures and includes:" --.

Signed and Sealed this
Eleventh Day of March, 2014

Michelle K. Lee
*Deputy Director of the United States Patent and Trademark Office*